(12) United States Patent
Yamashita et al.

(10) Patent No.: US 7,440,726 B2
(45) Date of Patent: Oct. 21, 2008

(54) INFORMATION PROVIDING METHOD FOR TRANSMITTING BROADCAST SIGNALS BEING RECEIVED BY A USER

(75) Inventors: Shinsuke Yamashita, Kanagawa (JP); Jun Moriya, Tokyo (JP)

(73) Assignee: Sony Corporation, Tokyo (JP)

( * ) Notice: Subject to any disclaimer, the term of this patent is extended or adjusted under 35 U.S.C. 154(b) by 312 days.

(21) Appl. No.: 10/526,902

(22) PCT Filed: May 18, 2004

(86) PCT No.: PCT/JP2004/007045

§ 371 (c)(1),
(2), (4) Date: Aug. 16, 2005

(87) PCT Pub. No.: WO2005/006614

PCT Pub. Date: Jan. 20, 2005

(65) Prior Publication Data

US 2006/0084376 A1    Apr. 20, 2006

(30) Foreign Application Priority Data

Jul. 14, 2003  (JP) ............................. 2003-274302
Sep. 4, 2003   (JP) ............................. 2003-313167
Oct. 10, 2003  (JP) ............................. 2003-352897

(51) Int. Cl.
*H04H 1/00*    (2006.01)
*H04M 3/42*    (2006.01)
*H04B 7/00*    (2006.01)
*H04B 1/18*    (2006.01)

(52) U.S. Cl. ................... 455/3.05; 455/3.01; 455/66.1; 455/414.1

(58) Field of Classification Search ................ 455/3.01, 455/3.06, 414.1, 150.1, 12.1, 13.1, 3.02, 455/3.05, 344, 66.1, 186.1; 709/219
See application file for complete search history.

(56) References Cited

U.S. PATENT DOCUMENTS 5,689,245 A * 11/1997 Noreen et al. .......... 340/825.49

(Continued)

FOREIGN PATENT DOCUMENTS

JP    2001-051926    2/2001

(Continued)

OTHER PUBLICATIONS

U.S. Appl. No. 10/526,902, filed Aug. 16, 2005, Yamashita et al.

(Continued)

*Primary Examiner*—Tilahun B Gesessse
(74) *Attorney, Agent, or Firm*—Oblon, Spivak, McClelland, Maier & Neustadt, P.C.

(57) ABSTRACT

The name of a broadcasting station, transmitting broadcast signals being received by a user, is to be informed extremely readily to the user. A radio receiver (2) transmits frequency data corresponding to the frequency of FM broadcast signals being received, and territory data corresponding to the territory where the radio receiver is used, to an information providing server (3) over the Internet (5). The information providing server (3) specifies the broadcasting station, transmitting the broadcast signals being received by the radio receiver (2), based on the frequency data and the territory data transmitted, and sends a letter/character string data and a call signal corresponding to the broadcasting station specified. The radio receiver (2) demonstrates the name of the radio station on a display based on the letter/character string data displayed.

14 Claims, 17 Drawing Sheets

U.S. PATENT DOCUMENTS

| | | | | |
|---|---|---|---|---|
| 5,832,223 | A | * 11/1998 | Hara et al. | 725/114 |
| 5,884,140 | A | * 3/1999 | Ishizaki et al. | 455/2.01 |
| 5,905,863 | A | * 5/1999 | Knowles et al. | 709/206 |
| 5,907,793 | A | * 5/1999 | Reams | 725/122 |
| 5,991,601 | A | * 11/1999 | Anderson | 340/7.1 |
| 5,991,737 | A | * 11/1999 | Chen | 705/26 |
| 6,014,569 | A | * 1/2000 | Bottum | 455/466 |
| 6,081,693 | A | * 6/2000 | Wicks | 340/7.21 |
| 6,282,412 | B1 | * 8/2001 | Lyons | 455/186.1 |
| 6,300,880 | B1 | * 10/2001 | Sitnik | 340/825.25 |
| 6,314,094 | B1 | * 11/2001 | Boys | 370/352 |
| 6,317,784 | B1 | * 11/2001 | Mackintosh et al. | 709/219 |
| 6,628,928 | B1 | * 9/2003 | Crosby et al. | 455/77 |
| 6,907,232 | B2 | * 6/2005 | Suzuki et al. | 455/186.1 |
| 7,107,045 | B1 | * 9/2006 | Knoop | 455/414.1 |
| 7,110,749 | B2 | * 9/2006 | Zellner et al. | 455/414.1 |
| 7,194,520 | B1 | * 3/2007 | Beard et al. | 709/217 |
| 2005/0060701 | A1 | 3/2005 | Murase | |
| 2005/0091679 | A1 | 4/2005 | Tanaka et al. | |

FOREIGN PATENT DOCUMENTS

| | | |
|---|---|---|
| JP | 2001-249940 | 9/2001 |
| JP | 2001-309349 | 11/2001 |
| JP | 2002-135671 | 5/2002 |
| JP | 2002-142210 | 5/2002 |
| JP | 2002-334092 | 11/2002 |
| JP | 2003-158726 | 5/2003 |

OTHER PUBLICATIONS

U.S. Appl. No. 10/554,542, filed Oct. 25, 2005, Iwatsu et al.
U.S. Appl. No. 10/564,317, filed Jan. 12, 2006, Kikkoji et al.
U.S. Appl. No. 10/557,207, filed Nov. 17, 2005, Kikkoji et al.
U.S. Appl. No. 10/555,654, filed Nov. 4, 2005, Kikkoji et al.
U.S. Appl. No. 10/556,944, filed Nov. 16, 2005, Kikkoji et al.
U.S. Appl. No. 10/563,258, filed Jan. 4, 2006, Iwatsu et al.
U.S. Appl. No. 10/557,141, filed Nov. 17, 2005, Murase et al.
U.S. Appl. No. 10/556,728, filed Nov. 14, 2005, Iwatsu et al.
U.S. Appl. No. 10/563,315, filed Jan. 4, 2006, Iwatsu et al.
U.S. Appl. No. 10/557,193, filed Nov. 17, 2005, Kikkoji et al.
U.S. Appl. No. 10/566,630, filed Jan. 31, 2006, Sakoh et al.
U.S. Appl. No. 10/561,187, filed Dec. 16, 2005, Araki et al.
U.S. Appl. No. 10/565,965, filed Jan. 26, 2006, Iwatsu.
U.S. Appl. No. 10/564,058, filed Jan. 10, 2006, Kikkoji et al.
U.S. Appl. No. 10/556,893, filed Nov. 15, 2005, Sakoh et al.
U.S. Appl. No. 10/557,040, filed Nov. 16, 2005, Kikkoji et al.
U.S. Appl. No. 10/556,729, filed Nov. 14, 2005, Kikkoji et al.
U.S. Appl. No. 10/555,990, filed Nov. 8, 2005, Murase et al.
U.S. Appl. No. 10/560,229, filed Dec. 12, 2005, Kikkoji et al.
U.S. Appl. No. 10/564,062, filed Jan. 10, 2006, Kikkoji et al.
U.S. Appl. No. 10/567,689, filed Feb. 9, 2006, Kikkoji et al.
U.S. Appl. No. 10/567,033, filed Feb. 3, 2006, Sakoh et al.
U.S. Appl. No. 10/572,743, filed Mar. 21, 2006, Kikkoji et al.
U.S. Appl. No. 10/564,414, filed Jan. 12, 2006, Sakoh et al.
U.S. Appl. No. 10/571,540, filed Mar. 10, 2006, Sakoh et al.
U.S. Appl. No. 10/567,776, filed Feb. 9, 2006, Iwatsu et al.
U.S. Appl. No. 10/568,968, filed Feb. 22, 2006, Okuzawa.
U.S. Appl. No. 10/569,227, filed Feb. 23, 2006, Yasuda.
U.S. Appl. No. 10/573,580, filed Mar. 24, 2006, Sakoh et al.
U.S. Appl. No. 10/573,418, filed Mar. 27, 2006, Iwatsu et al.
U.S. Appl. No. 10/571,458, filed Mar. 13, 2006, Iwatsu et al.
U.S. Appl. No. 10/571,774, filed Mar. 15, 2006, Sakoh et al.
U.S. Appl. No. 10/573,647, filed Mar. 28, 2006, Kikkoji et al.

* cited by examiner

| mail number | territory block | |
|---|---|---|
| | major classification | minor classification |
| 001 | Hokkaido | Sapporo |
| ... | ... | ... |
| 030 | northern Tohoku | Aomori |
| ... | ... | ... |
| 960 | Southern Tohoku | Fukushima |
| ... | ... | ... |
| 108 | Tokyo metropolitan area | Tokyo-to |
| ... | ... | ... |
| 400 | Tokyo metropolitan area | Yamanashi |
| ... | ... | ... |

FIG.6

| territory block | receivable radio station | | |
|---|---|---|---|
| | call sign | station name | frequency |
| Tokyo metropolitan area | JOAU | A station | 80.0 |
| Tokyo metropolitan area | JOAU | A station | 76.7 |
| Tokyo metropolitan area | JOAU | A station | 84.3 |
| Tokyo metropolitan area | JOAV | B station | 81.3 |
| Tokyo metropolitan area | JOTU | C station | 84.7 |
| Tokyo metropolitan area | JOTU | C station | 80.2 |
| Tokyo metropolitan area | ... | ... | ... |
| Tokyo metropolitan area | JOKG | D station | 84.7 |
| ... | ... | ... | ... |

FIG.7

| mail number, frequency and station name | number of times of registrations | |
|---|---|---|
| 100-0000 : 80.0Hz · A station | 100 | ~33 |
| 100-0001 : 80.0Hz · A station | 100 | |
| 100-0001 : 79.8Hz · D station | 1 | |
| 100-0002 : 80.0Hz · A station | 100 | |
| 100-0002 : 80.0Hz · D station | 0 | |

INFORMATION PROVIDING METHOD FOR TRANSMITTING BROADCAST SIGNALS BEING RECEIVED BY A USER

TECHNICAL FIELD

This invention relates to an information providing system and an information providing method conveniently applied to a system in which a broadcast receiving apparatus, such as a radio receiver or a TV receiver, and a server for transmitting the information to the broadcast receiving apparatus, are interconnected over a network. This invention also relates to a broadcast receiving apparatus for receiving the information from a server, connected thereto over a network, and to a broadcast receiving method conveniently applied to this broadcast receiving apparatus, This invention also relates to a broadcasting station notifying server, capable of transmitting the information to the broadcast receiving apparatus over the network, and specifying the name of the broadcasting station, transmitting the broadcast signals, received by the broadcast receiving apparatus, to notify the so specified name of the broadcasting station to the broadcast receiving apparatus, and to a broadcasting station specifying method conveniently applied to this broadcasting station notifying server.

This application claims priority of the Japanese Patent Application No. 2003-274302, filed in Japan on Jul. 14, 2003, Japanese Patent Application No. 2003-313167, filed in Japan on Sep. 4, 2003 and the Japanese Patent Application No. 2003-352897, filed in Japan on Oct. 10, 2003, the entireties of which are incorporated by reference herein.

BACKGROUND ART

With a radio receiver, provided on an audio stereo reproducing system, such as so-called audio or single component, portable audio or audio, mounted on -a car, a user may enjoy a program, such as music number, by receiving and demodulating broadcast signal, transmitted from a radio station. In a radio receiver, the frequency of broadcast signals received may be selected by a user. By selecting the frequency of broadcast signals received, the user may enjoy the program, as presented by a desired radio station, by selecting the frequency of the broadcast signals received.

On the other hand, each radio station lays open the information proper to each station, on the Internet, and presents to a listener the information relevant to the program being heard, such as title of the music number, that may be heard on the radio receiver, name of the performer or the title of the number of a CD having recorded thereon the music number being broadcast.

The Assignee company has already proposed an audio stereo reproducing system, having the Internet function (for example, see Non-Patent Publication 1). With this audio stereo reproducing system, the relevant information of the program, being heard by a user, may be acquired on a sole electronic device. Non-Patent Publication 1: Sony Cooperation, "bitplay style", [on-line] retrieved on Jun. 26, 2003, Internet, <URL:http://www.sony.jp/products/bitplay/bitplay_style/>

Meanwhile, since the broadcast signals, sent from each radio station, can be heard only in a limited area, plural radio stations, located in distinct areas, may transmit different sorts of the information, using the electrical waves of the same frequency. For example, there are two broadcasting stations employing 80.0 MHz, that is, a station in the Tokyo metropolitan area and a station in Northern Tohoku area.

Hence, a radio receiver is able to identify the frequency of broadcast signals, however, it cannot identify a radio station as a source of transmission of broadcast signals being received. On the other hand, the user is compelled to perform complex operations of acquiring and referencing a table showing the frequencies of the broadcast signals and the names of the radio stations, from one area to the next, in order to recognize the radio station as the source of transmission of broadcast signals being received.

Moreover, when acquiring the relevant information of broadcast signals being received, the user has to recognize the radio station, as the source of transmission of the broadcast signals being received, from the territory where the radio receiver is used, and from the frequency of the broadcast signals received, before accessing a home page of a radio station or a program. This operation needs to be carried out on an audio stereo reproducing system, having the Internet function, as well. That is, the user has to carry out complex operations even for acquiring the relevant information of broadcast signals from a home page as the broadcast signals are being received.

For evading these complex operations, there has so far been proposed a radio receiver carrying a storage unit in which the frequencies and the names of the radio stations are stored from one territory to another. With this radio receiver, the radio station can be identified from the territory where the radio receiver is used, and from the frequency of the broadcasting signals received, and demonstrated on a display, based on the data stored in the storage unit.

However, the broadcast signals, received by a radio receiver, are affected not only by the territory where it is used, but also by the environment under which it is used, such as surrounding buildings.

For example, if a first electrical wave broadcasting base station 100 and a second electrical wave broadcasting base station 101 are provided at a preset distance from each other, there are occasions where an area A capable of receiving broadcast signals from the first electrical wave broadcasting base station 100 is overlapped with an area B capable of receiving broadcast signals from the second electrical wave broadcasting base station 101. That is, a radio receiver used in a area of overlap of the areas A and B may receive both the signals broadcast from the first electrical wave broadcasting base station 100 and those broadcast from the second electrical wave broadcasting base station 101.

If a radio receiver is used in a place comprised within the area B but close to the boundary with the area A, with the place including a high-rise building built facing the second electrical wave broadcasting base station 101, the radio receiver cannot receive broadcast signals from the second electrical wave broadcasting base station 101, while it is able to receive signals broadcast from the first electrical wave broadcasting base station 100.

Moreover, if the user of the radio receiver is a subscriber to wired broadcast, a wire broadcast station collectively receives broadcast signals transmitted e.g. from the second electrical wave broadcasting base station 101, and converts the frequency to transmit the resulting signals over the cable. That is, the frequency of the broadcast signals, received by the radio receiver, differs from the frequency transmitted e.g. from the first and second electrical wave broadcasting base stations 101, 102.

As described above, the radio receiver may be receiving broadcast signals of the frequency not stored in the storage unit, under the effect of the environment in which the radio receiver is used. In such case, it becomes impossible to identify the radio station transmitting the broadcast signals received.

On the other hand, since the data stored in the storage unit are difficult to change, it is difficult to cause the new information to be stored in case a new radio station has been opened or closed.

Hence, with a radio receiver carrying a storage unit where the frequency and the name of the radio station are stored in a correlated fashion from territory to territory, the radio station, transmitting the broadcast signals being received, cannot be identified with sufficient accuracy.

DISCLOSURE OF THE INVENTION

This invention has been proposed in view of the above-depicted status of the art. It is an object of the present invention to provide an information providing system and an information providing method by means of which a user may readily recognize a broadcasting station transmitting broadcast signals received by a broadcast receiving apparatus. It is another object of the present invention to provide a broadcast receiving apparatus and an information receiving method by means of which a user may readily recognize a broadcasting station transmitting broadcast signals received by a broadcast receiving apparatus. It is yet another object of the present invention to provide a broadcasting station specifying server and a broadcasting station specifying method by means of which a user may readily recognize a broadcasting station transmitting broadcast signals received by a broadcast receiving apparatus and notify it to the broadcast receiving apparatus.

An information providing system according to the present invention is such a system in which a broadcast receiving apparatus for receiving and demodulating broadcast signals of a selected frequency and a broadcast station specifying server for specifying a broadcasting station as a source of transmission of the broadcast signals are interconnected over a network. The broadcast receiving apparatus includes a user transmitting means for transmitting data over the network, and a user receiving means for receiving data over the network. The broadcast station specifying server includes a broadcasting station specifying server storage means for storing frequency data corresponding to the frequency of the broadcasting signals, territory data corresponding to the territory where the broadcast receiving apparatus is used, and broadcasting station data corresponding to a broadcasting station specified by the frequency data and the territory data, a broadcasting station specifying server retrieving means for retrieving broadcasting station data stored in the broadcasting station specifying server storage means, based on the frequency data and the territory data, a broadcasting station specifying server receiving means for receiving data over the network, and a broadcasting station specifying server transmitting means for transmitting data over the network. The user transmitting means transmits the territory data and the frequency data to the broadcast station specifying server. The broadcasting station specifying server receiving means receives the territory data transmitted by the user transmitting means and frequency data corresponding to the frequency of broadcast signals received by the broadcast receiving apparatus. The broadcasting station specifying server retrieving means retrieves the broadcasting station data based on the territory data and the frequency data, received by the broadcasting station specifying server receiving means. The broadcasting station specifying server transmitting means transmits the broadcasting station data, retrieved by the broadcasting station specifying server retrieving means, to the broadcast receiving apparatus. The user receiving means receives the broadcasting station data, transmitted by the broadcasting station specifying server transmitting means.

A broadcast receiving apparatus for receiving and demodulating broadcast signals of a selected frequency according to the present invention comprises a receiving means for receiving data over a network, and a transmitting means for transmitting data over the network. The transmitting means transmits frequency data corresponding to the frequency of the broadcast signals being received, and territory data corresponding to the territory where the broadcast receiving apparatus is used, to a broadcasting station specifying server specifying broadcasting station data corresponding to a broadcasting station transmitting the broadcasting signals. The receiving means receives broadcasting station data transmitted from the broadcasting station specifying server.

A broadcasting station specifying server, connected over a network to a broadcast receiving apparatus, adapted for receiving and demodulating broadcast signals transmitted from a broadcasting station, according to the present invention, comprises a storage means for storing frequency data corresponding to the frequency of the broadcast signals, territory data corresponding to the territory where the broadcast receiving apparatus is used, and broadcasting station data corresponding to the broadcasting station specified by the frequency data and the territory data, a receiving means for receiving the frequency data and the territory data transmitted from the broadcast receiving apparatus, a retrieving means for retrieving broadcasting station data corresponding to a broadcasting station transmitting broadcast signals being received by the broadcast receiving apparatus, from broadcasting station data stored in the storage means, based on the frequency data and the territory data, received by the receiving means, and a transmitting means for transmitting the broadcasting station data, retrieved by the retrieving means, to the broadcast receiving apparatus.

An information providing method according to the present invention comprises a first interconnecting step of interconnecting a broadcast receiving apparatus for receiving and demodulating broadcast signals of a selected frequency and a broadcast station specifying server specifying a broadcasting station as a source of transmission of the broadcast signals, over a network, a first transmitting step of the broadcast receiving apparatus transmitting frequency data corresponding to the frequency of broadcast signals being received, and territory data corresponding to a territory where the broadcast receiving apparatus is used, to the broadcast station specifying server, a first receiving step of the broadcast station specifying server receiving the frequency data and the territory data transmitted in the first transmitting step, a first retrieving step of retrieving broadcasting station data corresponding to a broadcasting station transmitting the broadcast signals being received by the broadcast receiving apparatus, based on the frequency data and the territory data received in the first receiving step, and a second transmitting step of transmitting the broadcasting station data, retrieved by the first retrieving step, to the broadcast receiving apparatus.

A method for receiving the information by a broadcast receiving apparatus, receiving and demodulating broadcast signals of a selected frequency, according to the present invention, comprises a first connecting step of connecting to a broadcasting station specifying server specifying a broadcasting station transmitting the broadcast signals over a network, a first transmitting step of transmitting frequency data corresponding to the frequency of broadcast signals being received and territory data corresponding to the territory where the broadcast receiving apparatus is used, to the broadcasting station specifying server over the network, and a first receiving step of receiving broadcasting station data, corresponding to a broadcasting station transmitting the broadcast signals being received, from the broadcasting station specifying server.

A method for specifying a broadcasting station by a broadcasting station specifying server connected over a network to a broadcast receiving apparatus receiving and demodulating broadcast signals of a selected frequency, according to the present invention, comprises a receiving step of receiving frequency data corresponding to the frequency of broadcast signals received by the broadcast receiving apparatus and territory data corresponding to the territory where the broadcast receiving apparatus is used, a retrieving step of retrieving broadcasting station data corresponding to the broadcasting station transmitting the broadcast signals being received by the broadcast receiving apparatus, based on the frequency data and the territory data received in the receiving step, and a transmitting step of transmitting the broadcasting station data retrieved by the retrieving step to the broadcast receiving apparatus.

With the information providing system, broadcast receiving apparatus, broadcasting station specifying server, information providing method, information receiving method and the broadcasting station specifying method, according to the present invention, the frequency data and territory data transmitted are received from the broadcast receiving apparatus, broadcasting station data corresponding to the broadcasting station transmitting broadcast signals received by the broadcast receiving apparatus are retrieved, based on the territory data and the frequency data received, and the broadcasting station data retrieved are transmitted to the broadcast receiving apparatus.

Thus, with the information providing system, broadcast receiving apparatus, broadcasting station specifying server, information providing method, information receiving method and the broadcasting station specifying method, according to the present invention, it is possible to identify the broadcasting station transmitting broadcast signals received by broadcast receiving apparatus. Moreover, according to the present invention, the user of the broadcast receiving apparatus may be advised of the broadcasting station transmitting broadcast signals being received by broadcast receiving apparatus.

The information providing system, according to the present invention, is such an information providing system in which the broadcast receiving apparatus receiving and demodulating the broadcast signals of the selected frequency and the broadcasting station specifying server identifying the broadcasting station transmitting broadcast signals are interconnected over a network. The broadcast receiving apparatus includes inputting means for inputting the names of the broadcasting stations, and broadcasting station specifying data transmitting means for forming broadcasting station name data indicating the name of the broadcasting station entered by the inputting means and for correlating the broadcasting station name data, frequency data indicating the frequency of the broadcast signals being received and territory data indicating the territory where the broadcast receiving apparatus is being used, to transmit the correlated data as broadcasting station specifying data. The broadcasting station specifying server includes storage means for storing the broadcasting station specifying data transmitted from the broadcast receiving apparatus.

The broadcast receiving apparatus according to the present invention is connected over a network to the broadcasting station specifying server, identifying the broadcasting station transmitting broadcast signals, receiving the broadcast signals of the selected frequency, and demodulating the received signals. The broadcast receiving apparatus includes inputting means for inputting the names of the broadcasting stations, and broadcasting station specifying data transmitting means for forming broadcasting station name data indicating the name of the broadcasting station entered by the inputting means and for correlating the broadcasting station name data, frequency data indicating the frequency of the broadcast signals being received and territory data indicating the territory where the broadcast receiving apparatus is being used, to transmit the resulting correlated data as broadcasting station specifying data.

The broadcasting station specifying server according to the present invention is such a broadcasting station specifying server connected over a network to a broadcast receiving apparatus receiving broadcast signals of the selected frequency and demodulating the received signals to specify the broadcasting station transmitting the broadcast signals. The broadcasting station specifying server includes storage means having stored therein the broadcasting station name data indicating the name of the broadcasting station, frequency data indicating the frequency of the broadcast signals being received, and territory data indicating the territory where the broadcast receiving apparatus is used, as correlated broadcasting station specifying data, and receives the broadcasting station specifying data, transmitted from the broadcast receiving apparatus, to record the so received data in the storage means.

The information providing method according to the present invention is such an information providing method of the information providing system in which the broadcast receiving apparatus receiving and demodulating broadcast signals of a selected frequency and the broadcasting station specifying server specifying the broadcasting station transmitting the broadcast signals are interconnected over a network. The information providing method according to the present invention includes a broadcasting station name inputting step of the broadcast receiving apparatus inputting the name of the broadcasting station, a broadcasting station name data formulating step of the broadcast receiving apparatus formulating the broadcasting station name data from the name of the broadcasting station input in the broadcasting station name inputting step, a first transmitting step of transmitting the broadcasting station name data indicating the name of the broadcasting station, frequency data indicating the frequency of the broadcast signals being received, and territory data indicating the territory where the broadcast receiving apparatus is used, as correlated broadcasting station specifying data, to the broadcasting station specifying server, and a recording step of the broadcasting station specifying server receiving the broadcasting station specifying data transmitted from the broadcast receiving apparatus to store the received data in storage means.

In the information providing system, broadcast receiving apparatus, information providing system and the broadcasting station specifying server, according to the present invention, described above, the broadcast receiving apparatus formulates the broadcasting station name data from the broadcasting station name as entered by the user, and correlates the so formulated broadcasting station name data, frequency data and the territory data to form broadcasting station data which is stored in the broadcasting station specifying server.

Thus, in the information providing system, broadcast receiving apparatus, information providing system and the broadcasting station specifying server, according to the present invention, the radio station specifying data stored in the broadcasting station specifying server may be rewritten, so that the broadcasting station transmitting the broadcast signals being received by the broadcast receiving apparatus may be identified high accurately, and hence the user may be advised of the radio station name readily and highly accurately.

BRIEF DESCRIPTION OF THE DRAWINGS

FIG. 6 shows a territory specifying table stored in a database provided in a terminal management server forming the information providing system.

FIG. 7 is a radio station specifying table stored in a database provided in the terminal management server forming the information providing system.

FIG. 11 shows a table stored in a database provided in a radio station specifying server forming the information providing system.

BEST MODE FOR CARRYING OUT THE INVENTION

Figure 1:
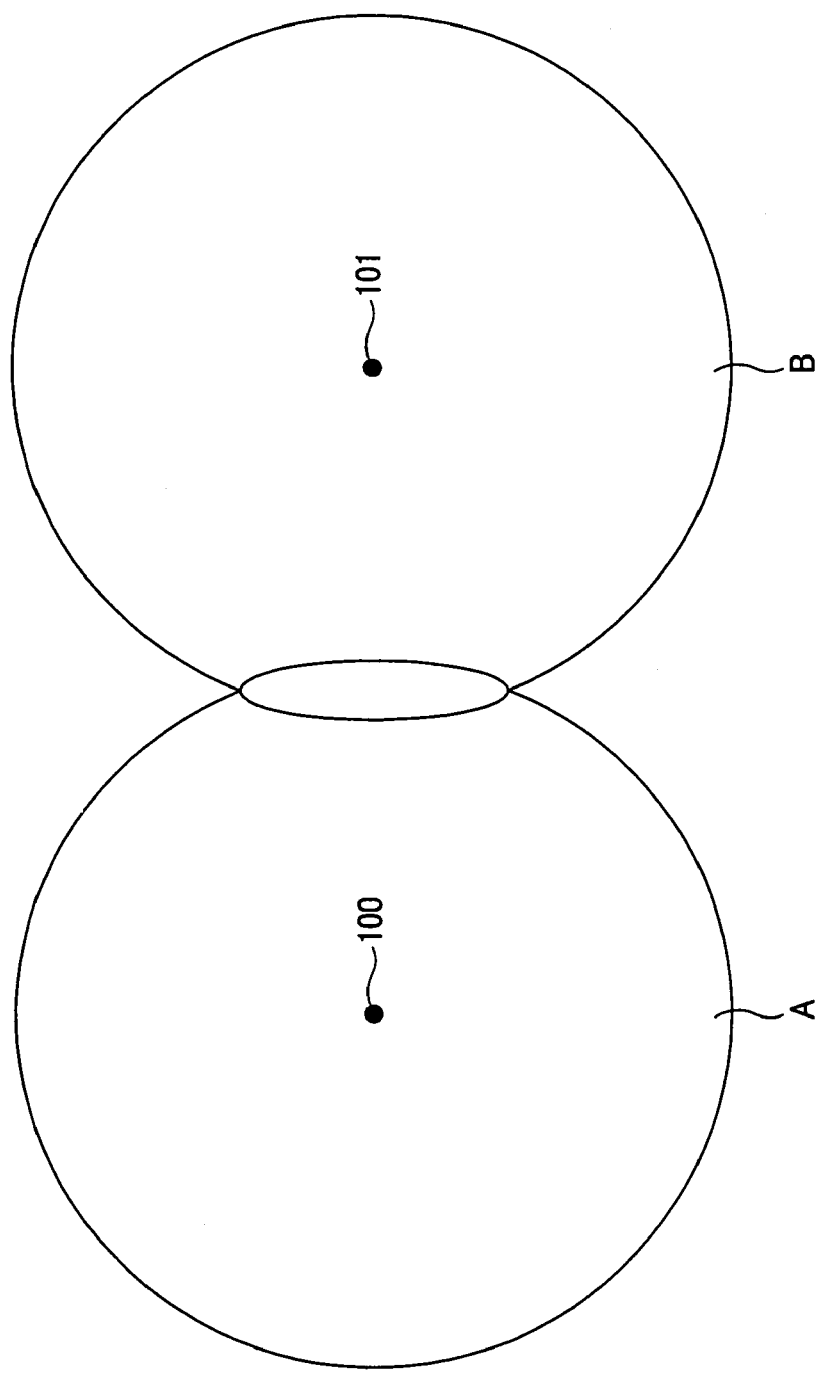
FIG. 1 schematically shows the state in which the coverage areas of FM broadcast signals, sent from two electrical wave broadcast base stations, transmitting FM broadcast signals to different neighboring territories, partially overlap each other.
Figure 2:
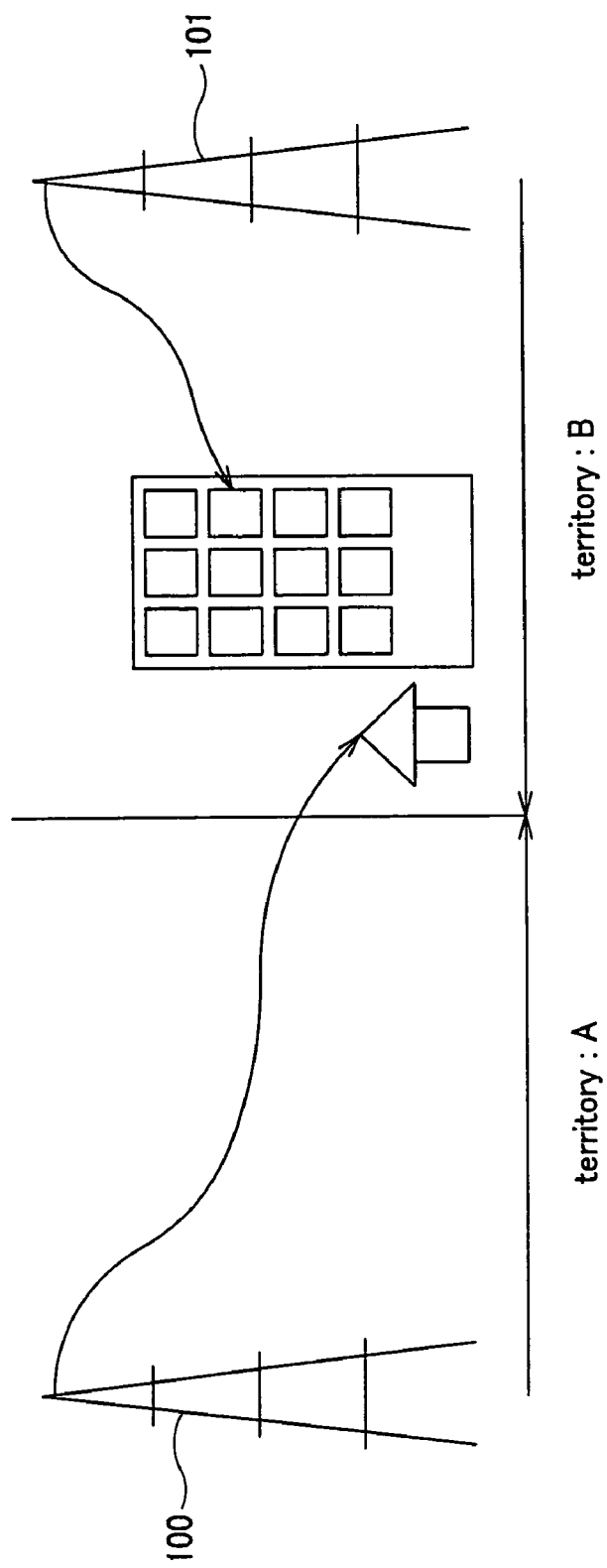
FIG. 2 schematically shows the state in which a radio receiver is receiving FM broadcast signals, sent to a neighboring region, without receiving the FM broadcast signals, sent to the region in which the radio receiver is used.
Figure 3:
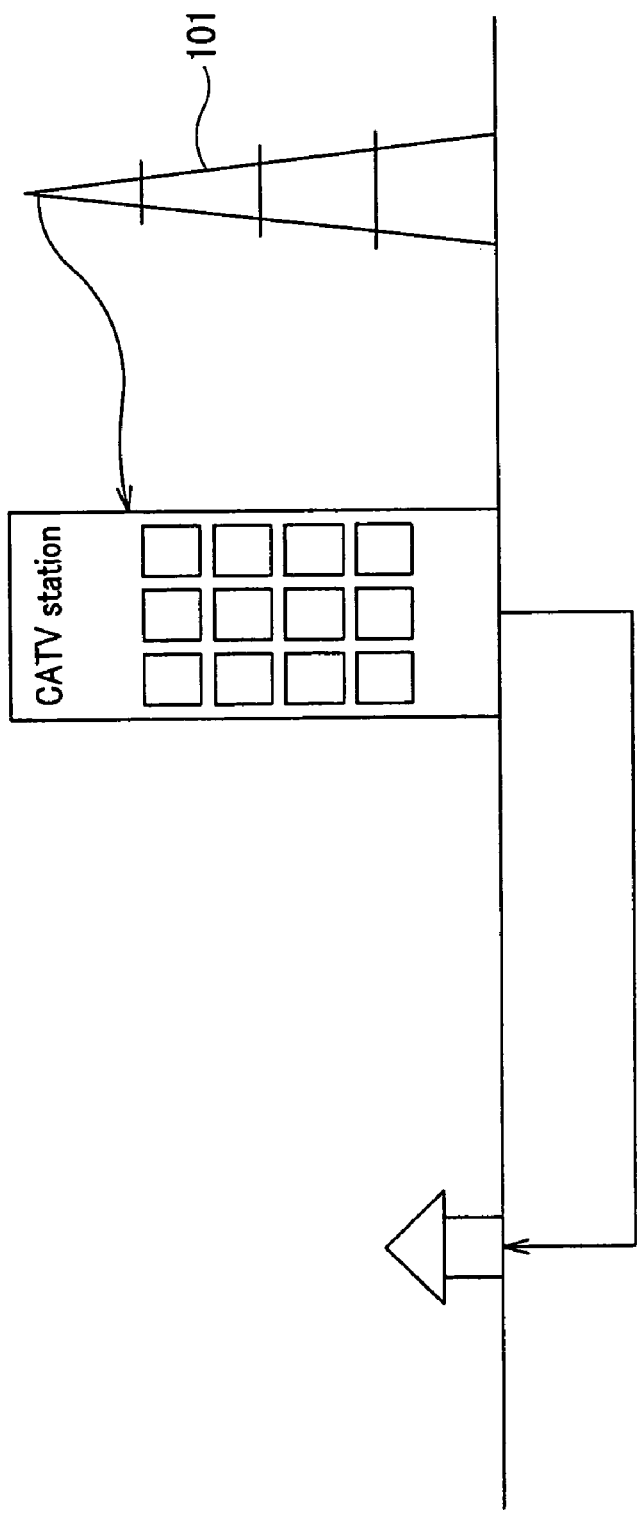
FIG. 3 schematically shows the state in which a wire broadcast station is transmitting FM broadcast signals, as the frequency thereof is changed, in case a user is a subscriber to the wire broadcast.

Referring to the drawings, an information providing system embodying the present invention is now explained in detail.

Figure 4:
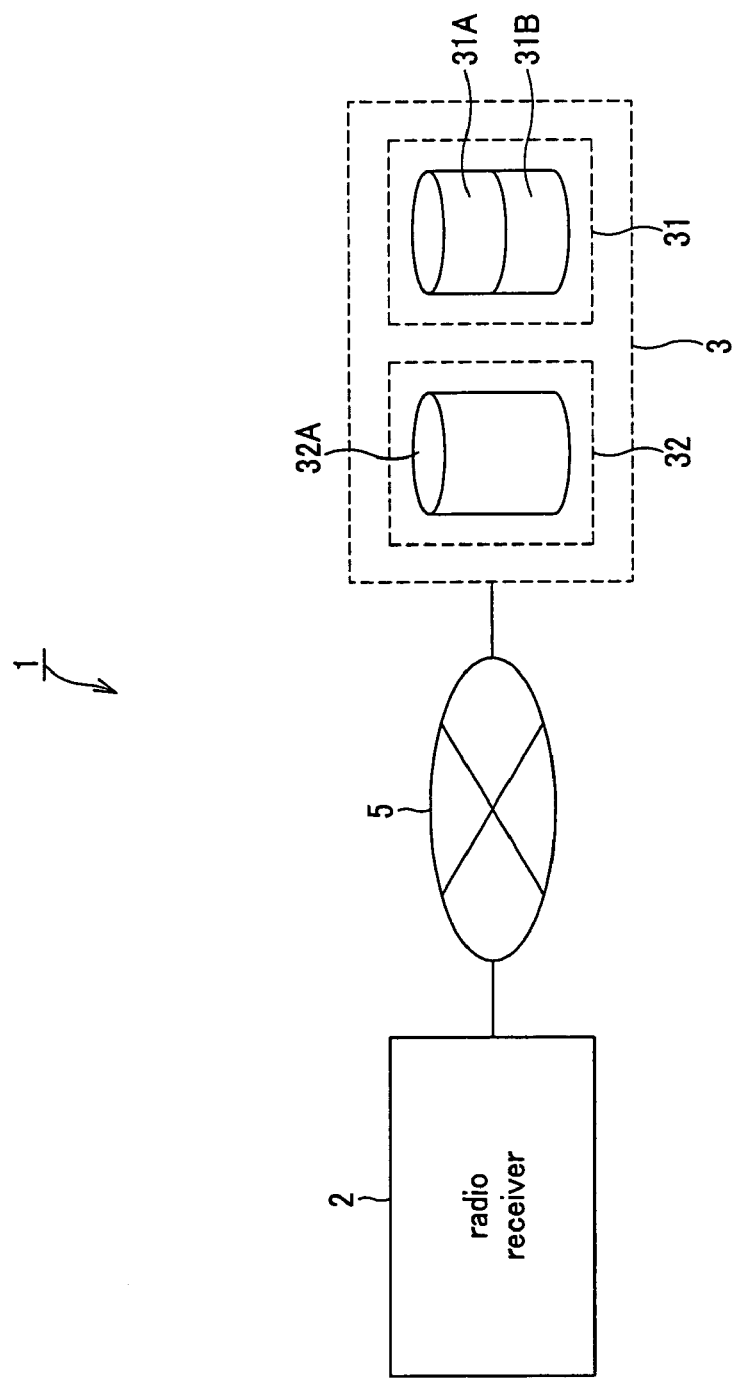
FIG. 4 shows the structure of an information providing system embodying the present invention.

In an information providing system 1, embodying the present invention, a radio receiver 2 and an information providing server 3 are interconnected over the Internet 4, as shown in FIG. 4. Meanwhile, a plural number of the radio receivers 2 may be connected to the Internet.

The radio receiver 2 receives and demodulates the FM broadcast signals, transmitted from a radio station, to radiate the sound. The radio receiver 2 transmits frequency data, indicating the frequency of the FM broadcast signals being received, and territory data indicating the territory in which the radio receiver 2 is being used, to the information providing server 3. The radio receiver 2 also receives radio station specifying data, made up by radio station name data, as the source of transmission of FM broadcast signals being received, frequency data, and by territory data, from the information providing server 3. The name of the radio station is displayed, based on the radio station specifying data received. The radio receiver 2 also receives relevant information data, corresponding to the relevant information of the FM broadcast signals received, and displays the relevant information of the FM broadcast signals received, based on the relevant information data received. The radio receiver 2 is also supplied with the name of the radio station, as the source of transmission of the FM broadcast signals being received, forms radio station name data, correlates the so formed radio station name data, frequency data indicating the frequency of the FM broadcast signals received and territory data indicating the territory where the radio receiver 2 is being used, and transmits the resulting radio station specifying data to the information providing server 3.

The information providing server 3 transmits the radio station data for the radio station, as the source of transmission of the FM broadcast signals, received by the radio receiver 2, and relevant information data corresponding to the FM broadcast signals, received by the radio receiver 2, to the radio receiver 2. The information providing server 3 also performs registration and log-in necessary for the radio receiver 2 to receive radio station data or relevant information data from the information providing server 3.

Figure 5:
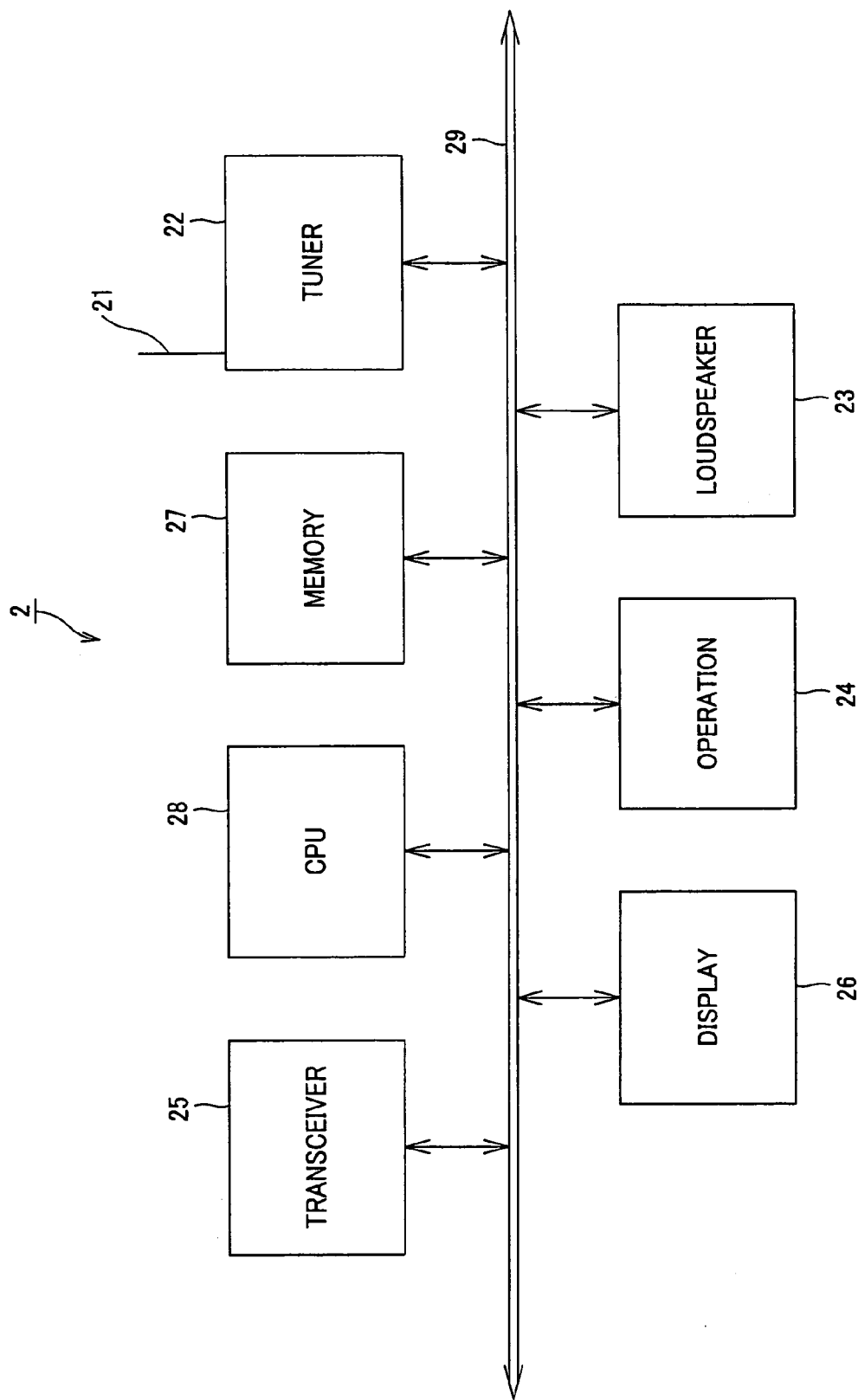
FIG. 5 shows the structure of a radio receiver forming the information providing system.

Referring to FIG. 5, the radio receiver 2 is explained in detail.

The radio receiver 2 includes an antenna 21 for receiving FM broadcast signals, received from each radio station, a tuner 22 for selecting the frequency of the FM signals, received by the antenna 21, and for demodulating the FM broadcast signals, received by the antenna 21, and a loudspeaker 23 for radiating the audio based on signals supplied form the tuner 22.

The radio receiver 2 also includes an operating unit 24, acted on by a user for specifying the operations of various components, a transceiver unit 25 for transmitting/receiving data over the Internet 5, a display unit 26 for demonstrating letters/characters or images, based on data input by the operating unit 24 or received by the transceiver unit 25, a memory 27 for storage of data entered by the operating unit 24 or received by the transceiver unit 25, and a CPU (central processing unit) 28 for controlling the various components.

The antenna 21, tuner 22, loudspeaker 23, operating unit 24, transceiver unit 25, display unit 26, memory 27 and the CPU 28 are separately connected to a bus 29.

The tuner 22 selects the frequency of FM broadcast signals received by the antenna 21. That is, the frequency of the FM broadcast signals, received by the radio receiver 2, becomes the frequency selected by the tuner 22. The tuner 22 also converts the FM broadcast signals, received by the antenna 21, into signals of the audio frequency. The frequency selected by the tuner 22 is determined by the user. The user acts on e.g. the operating unit 24 to decide on the frequency selected by the tuner 22 (this operation is also referred to below as tuning).

The operating unit 24 is acted on when the user enters a letter/character demonstrated on the display 26 or when the user transmits the information through the transceiver unit 25 to the information providing server 3. The user is also able to enter a preset number by acting on the operating unit 24. This preset number is coordinated with a specified frequency, so that, when the user enters the preset number, the tuner 22 selects the frequency, coordinated to the input preset number, as the frequency of the FM broadcast signals to be received by the antenna 21. The user also acts on the operating unit 24 to input the radio station name.

The transceiver unit 25 interconnects the radio receiver 2 and the information providing server 3 over the Internet 5. The transceiver unit 25 is responsive to operations by the user on the operating unit 24 to send data, such as a device ID, a user ID, a password, a call sign corresponding to a radio station, mail number data, corresponding to the mail number, or frequency data corresponding to the frequency selected by the tuner 22, over the Internet 5. The transceiver unit 25 also receives data, such as a call sign corresponding to the radio station as a source of transmission of the FM broadcast signals received, letter/character string data or relevant information data corresponding to the relevant information of the FM broadcast signals, being received, from the information providing server 3, over the Internet 5. The transceiver unit 25 is also responsive to the user acting on the operating unit 24 to transmit radio station specifying data, as later explained, to the information providing server.

The display unit 26 demonstrates e.g. the frequency of FM broadcast signals received by the radio receiver 2. The display unit 26 also demonstrates e.g. the name of the radio station, as a source of transmission of the FM broadcast signals received by the radio receiver 2, the name of the radio station entered by the user acting on the operating unit 24, or the relevant information of the FM broadcast signals, received by the radio receiver 2, based on data received by the radio receiver 2.

The memory 27 memorizes data entered by the user acting on the operating unit 24, frequency data corresponding to the frequency, coordinated to each preset button, data received by the transceiver unit 25, or the relevant information data.

The CPU 28 controls the various component parts, while transmitting frequency data of the radio station, tuned by acting on the operating unit 24, and territory data, indicating the territory where the radio receiver 2 is used, to the information providing server 3, in accordance with a program stored in a ROM (read-only memory). The CPU 28 also causes the call sign, received by the information providing server 3, specifying the radio station, selected by the operating unit 24, and letter/character string data for indicating the name of the radio station, to be demonstrated on the display unit 26. From the name of the radio station, entered by acting on the operating unit 24, radio station name data are prepared. The so prepared radio station name data, frequency data corresponding to the frequency of the FM signals being received, and territory data, indicating the territory where the radio receiver 2 is used, are coordinated and transmitted as radio station specifying data to the information providing server 3. In the present embodiment, mail number data, specifying the mail number, is used as territory data. By employing the mail number data, it becomes possible to subdivide the territory of Japan in 12000 sub-territories to enable the radio station name to be specified more accurately. Moreover, the radio station name data, transmitted from the information providing server 3, is registered by recording the data in the memory as it is coordinated to frequency data indicating the frequency being, received.

The information providing server 3 is now explained in detail.

The information providing server 3 includes a terminal management server 31, and a now-on-air server (NoA server) 32.

The terminal management server 31 includes a customer management server 31A and a radio station specifying database 31B.

The customer management server 31A has stored therein a device ID of the radio receiver 2, a user ID associated with the device ID, and a password. The radio station specifying database 31B has stored therein a territory specifying table, a radio station specifying table, a letter/character string data, and a call sign associated with each radio station.

The territory specifying table is a table for specifying the territory of use of the radio receiver 2 based on territory data transmitted from the radio receiver 2. For example, it is a table specifying the territory where the radio receiver 2 is used, by mail number data, corresponding to mail numbers, used as territory data, as shown in FIG. 6.

The radio station specifying table is a table showing territory-wise relationship between the frequencies and the radio stations, as shown in FIG. 7. The radio station specifying table is re-written when for example a new radio station has been opened. Meanwhile, FIG. 7 depicts the table showing the relation between the frequencies and the radio stations in the Tokyo metropolitan area.

The letter/character string data is the data for displaying radio station names in a display 26 of the radio receiver 2. The call sign is data accorded to each radio station and, if the radio receiver 2 sends a call sign corresponding to the broadcasting station as a source of transmission of FM broadcast signals being received, to the information providing server 3, the information providing server 3 is able to recognize the broadcasting station as a source of transmission of the FM broadcast signals, received by the radio receiver 2, based on the call sign transmitted from the radio receiver 2.

The NoA server 32 includes a NoA database 32A. This NoA database 32A memorizes relevant information data, sequentially transmitted from the radio station, as time elapses. Each radio station sequentially transmits relevant information data, corresponding to the relevant information of the FM broadcast signals, being transmitted, to the NoA server 32. Specifically, the names of the musical numbers being aired, names of performers, playing time, CD numbers, or the sponsor information of the program being aired, are transmitted. The NoA server 32 records relevant information data, transmitted from the radio station, in the NoA database 32A. Moreover, the NoA server 32 is responsive to a NoA connection request, transmitted from the radio receiver 2, to transmit the relevant information data, stored in the NoA database 32A, to the radio receiver 2.

Data transmission/reception among the radio receiver 2, information providing server 3 and the radio station, carried out in the above-described information providing system 1, is hereinafter explained.

Figure 8:
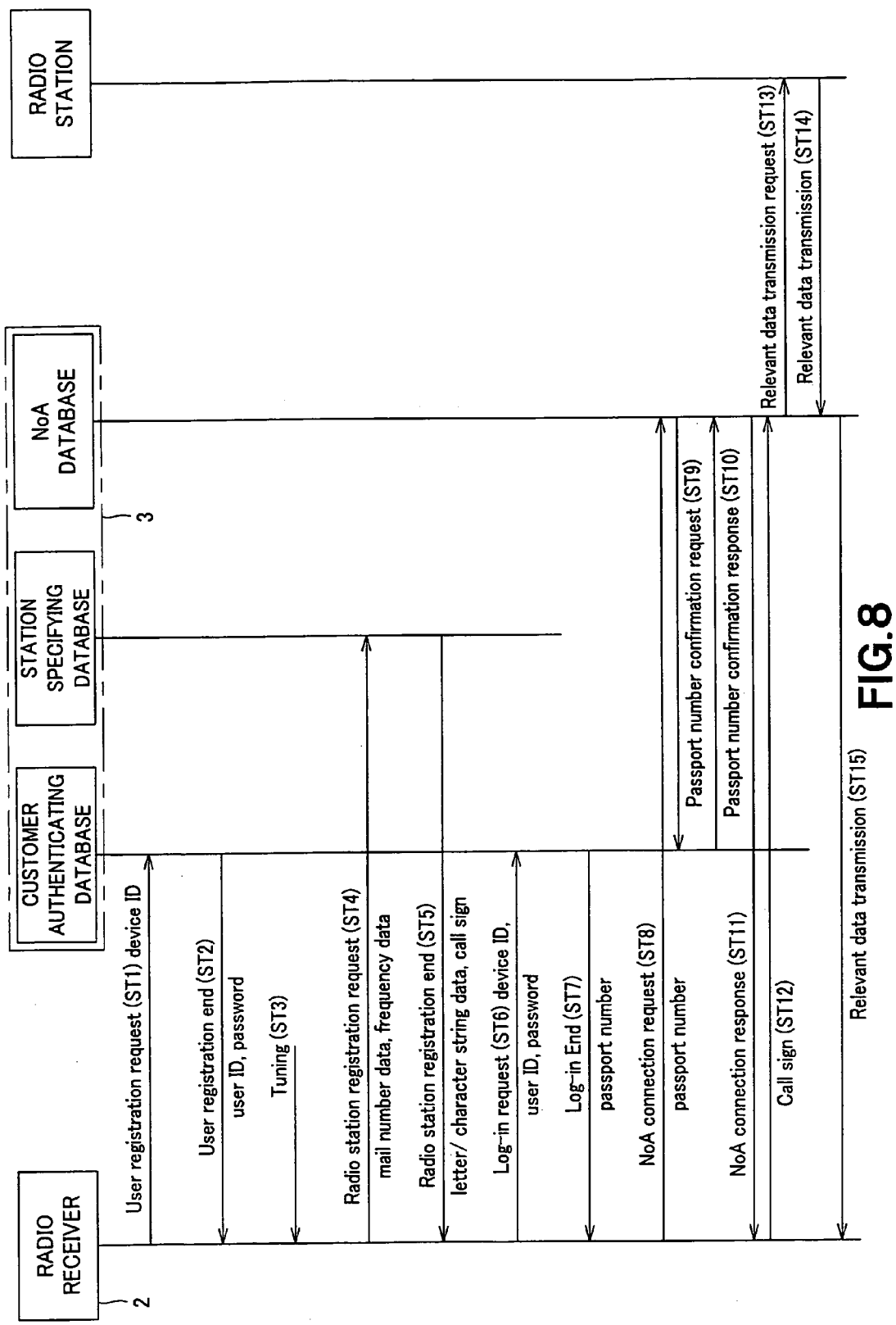
FIG. 8 illustrates transmission/receipt of the information between a radio receiver and an information providing server in the information providing system.

Referring to FIG. 8, a user acts on the operating unit 24, first of all, to transmit a user registration request to the terminal management server 31 (step ST1). Specifically, a device ID is transmitted to the terminal management server 31.

The terminal management server 31 then completes user registration (step ST2). Specifically, a user ID, associated with the device ID, and the password, are issued and transmitted to the radio receiver 2. The device ID of the radio receiver 2, the user registration of which has been completed, the user ID, issued in association with the device ID, and the password, are stored in the customer management server 31A.

The user then tunes the radio receiver 2 (step ST3). When tuned, the radio receiver 2 demonstrates, in the display 26, the name of the radio station, as a source of transmission of the FM broadcast signals being received (steps ST4 and ST5).

Figure 9:
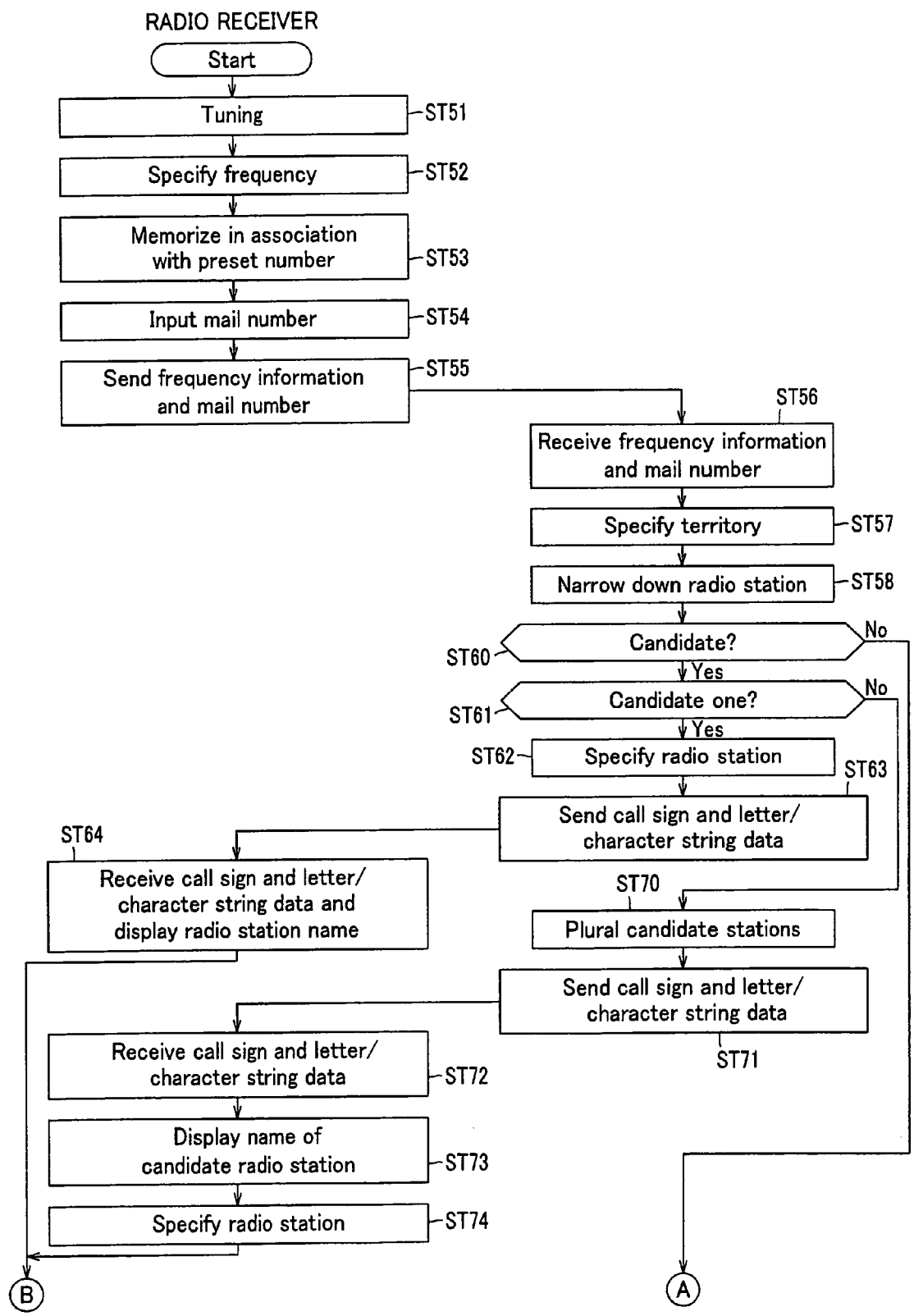
FIG. 9 illustrates transmission/receipt of the information between a radio receiver and an information providing server in case a candidate radio station is recorded in a radio station specifying server.
Figure 10:
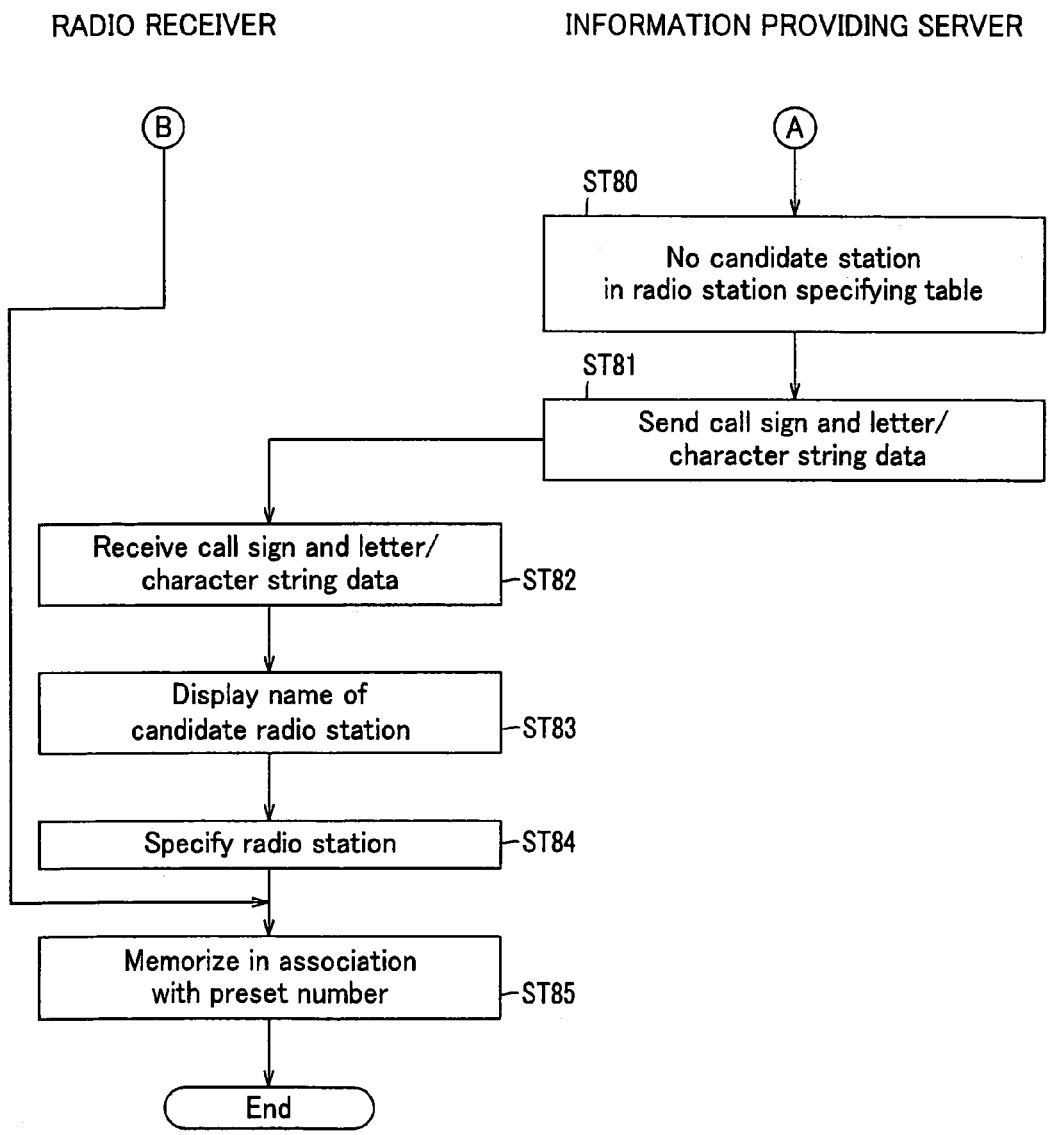
FIG. 10 illustrates transmission/receipt of the information between a radio receiver and an information providing server in case a candidate radio station is not recorded in a radio station specifying server.

Referring to FIGS. 9 and 10, data transmission/reception, carried out between the radio receiver 2 and the information providing server 3, when the name of the radio station transmitting the FM broadcast signals being received is demonstrated on the display 26 of the radio receiver 2, is now explained in detail.

First, as shown in FIG. 9, the user tunes the radio receiver 2 to select the frequency of the FM broadcast signals received by the antenna 21 (step ST51). The frequency selected by the tuner 22 is specified by the CPU 28 (step ST52). Meanwhile, if the frequency specified by the CPU 28 is not stored as it is correlated with the preset number, the frequency specified by the CPU 28 may be stored in association with the preset number (step ST53).

The user then acts on the operating unit 24 to enter the mail number associated with the territory where the radio receiver 2 is used (step ST54). Then, frequency data, corresponding to the frequency selected by the tuner 22, and mail number data, corresponding to the mail number, entered in the step ST54, are transmitted through the transceiver unit 25 to the terminal management server 31 (step ST55).

The terminal management server 31 then receives the frequency data and the mail number data transmitted from the radio receiver 2 (step ST56), and identifies the territory of use of the radio receiver 2, based on the mail number data and on the territory number data (step ST57). For example, if the mail number 106 has been entered in the step ST54, the territory where the radio receiver 2 is used is identified from the territory specifying table of FIG. 6 to be the Tokyo metropolitan area. Then, based on the territory, identified in the step ST57, the radio station specifying table is selected and, based on the so selected radio station specifying table and the frequency data, the radio station, transmitting the FM broadcast signals, being received by the radio receiver 2, is determined by a narrowing-down process (step ST58). For example, if, in the step ST57, it is determined that the radio receiver 2 is being used is the Tokyo metropolitan area, the radio station specifying table, shown in FIG. 7, is selected and, based on the radio station specifying table shown in FIG. 7 and on the frequency data, received in the step ST56, the radio station, as the source of transmission of the FM broadcast signals, being received by the radio receiver 2, is determined by the narrowing-down process.

Then, in a step ST60, the terminal management server 31 verifies whether or not the candidate radio station has been recorded in the radio station specifying table. If the candidate radio station has been recorded in the radio station specifying table, the terminal management server proceeds to a step ST61 and, if otherwise, the terminal management server proceeds to a step ST80.

In the step ST61, the terminal management server 31 verifies whether or not the number of the candidate radio station is one. If it is one, the terminal management server proceeds to a step ST62 and, if it is two or more, the terminal management server proceeds to a step ST70.

In the step ST62, the terminal management server 31 determines that the radio station, indicated as a candidate in the step ST61, as being the radio station, transmitting the FM broadcast signals received by the radio receiver 2. For example, if the frequency is 80.0 MHz, the sole candidate radio station is the broadcasting station A (FM Tokyo), so that the station A is determined to be the transmitting radio station.

Then, in a step ST63, the terminal management server 31 sends letter/character string data and the call sign, transmitted from the terminal management server 31, and demonstrates the name of the radio station on the display 26, based on the letter/character string data, to record the call sign in the memory 27. The terminal management server then proceeds to a step ST85.

In a step ST70, the terminal management server 31 recognizes that there are plural candidate radio stations as sources of transmission of the FM broadcast signals received by the radio receiver 2. For example, when the frequency is 84.7 MHz, in the table shown in FIG. 7, two stations, that is a station C (FM Yokohama) and a station D (NHK-Yamanashi), become candidate stations.

Then, in a step ST71, the terminal management server 31 sends the letter/character string data, and call signs, associated with the plural radio stations recognized in the step ST70, to the radio receiver 2.

Then, in a step ST72, the radio receiver 2 receives the letter/character string data, and the call signs, sent from the terminal management server 31.

In the next step ST73, the radio receiver 2 demonstrates, on its display 26, the names of plural radio stations, based on the letter/character string data, transmitted from the terminal management server 31.

In the next step ST74, the user selects one of the radio stations, demonstrated on the display 26, to specify the radio station transmitting the FM broadcast signals received by the radio receiver 2. When the radio station transmitting the FM broadcast signals received is identified, the radio receiver 2 demonstrates only the name of the so identified radio station on the display 26. The radio receiver also records the call sign of the so identified radio station in the memory 27, before proceeding to the step ST85.

In a step ST80, the terminal management server 31 recognizes that the candidate radio station transmitting the FM broadcast signals received by the radio receiver 2 is not indicated in the radio station specifying table selected in the step ST58. For example, if a cable TV station is re-transmitting FM broadcast signals, the FM broadcast signals, transmitted by an electrical wave of a frequency, not shown in the radio station specifying table, may be received by the radio receiver 2.

In the next step ST81, the terminal management server 31 sends to the radio receiver 2 the letter/character string data and the call signs of all of the radio stations that may be received in the territory specified by mail number data.

In the next step ST82, the radio receiver 2 receives the letter/character string data and the call signs transmitted from the terminal management server 31.

In the next step ST83, the radio receiver 2 demonstrates plural names of radio stations on the display 26, based on letter/character string data transmitted from the terminal management server 31.

In the next step ST84, the user selects one of plural radio stations, demonstrated on the display 26, to specify the radio station transmitting the FM broadcast signals being received by the radio receiver 2. As the radio station, transmitting the FM broadcast signals being received by the radio receiver 2, is specified, the radio receiver 2 demonstrates the name of the radio station specified on the display 26, and records the call sign of the radio station specified in the memory 27, before proceeding to a step ST85.

In the step ST85, the radio receiver 2 records the letter/character data and the call sign, associated with the specified radio station, along with the frequency, selected by the tuner 22, in association with the preset number, in the memory 27. The radio receiver 2 then terminates the operations. The processing of step ST85 may be omitted, if so desired by the user.

Reverting to FIG. 8, the user acts on the operating unit 24 so that the radio receiver 2 transmits a log-in request to the terminal management server 31 (step ST6). Specifically, the radio receiver 2 sends a device ID, a user ID and a password to the terminal management server 31.

On receipt of the log-in request from the radio receiver 2, the terminal management server 31 confirms that the device ID, user ID and the password, supplied from the radio receiver 2, have been stored in the customer management server 31A, and then issues a passport number, which is then sent to the radio receiver 2 to complete the log-in (step ST7). By employing the passport number in the information providing system 1, the radio receiver 2 is able to request transmission of the information directly to the NoA server 32 without having the device ID, user ID and the password confirmed by the terminal management server 31. The passport number is an authentication ticket. The passport number is effective only for a preset time since the time it is issued.

After completion of log-in, the radio receiver 2 transmits a NoA coupling request, requesting the transmission of the information relevant to the FM broadcast signals being received, every preset time interval, to the NoA server 32 (step ST8). Specifically, the radio receiver 2 transmits the passport number and the call sign of the broadcasting station, transmitting the FM broadcast signals being received by the radio receiver 2, to the NoA server 32. The NoA coupling request is sent at stated time intervals.

The NoA server 32 requests passport number confirmation to the terminal management server 31 as to whether or not the passport number sent from the radio receiver 2 is the authentication ticket correctly issued by the terminal management server 31 (step ST9). The terminal management server 31 verifies whether or not the passport number received from the NoA server 32 has been stored in the customer management database 31A and returns the results as a response to the passport number confirming request to the NoA server 32 (step ST10). When the passport number received by the radio receiver 2 is correctly authenticated by the terminal management server 31, the NoA server 32 issues a NoA server authenticating ticket to store it in the NoA database 32A to send the so issued NoA server authenticating ticket to the radio receiver 2 (step ST11).

If authenticity is approved by the NoA server, the radio receiver 2 makes a NoA request to the NoA server 32, based on the call sign (step ST12).

The NoA server 32 receives the NoA server authenticating ticket and the call sign from the radio receiver 2. If the NoA server authenticating ticket is valid, the NoA server requests the radio station to transmit relevant data to (step ST13).

When requested by the NoA server 32 to supply the relevant information, the radio station sends relevant information data, corresponding to the relevant information of the FM broadcast signals being transmitted, to the NoA server 32 (ST14). For example, the radio station sends the relevant information data, corresponding to the relevant information of the music number aired at the time point of receipt of the NoA request by the NoA server 32, and the relevant information data, corresponding to the relevant information of several music numbers aired before the music number aired at the time point of receipt of the NoA request, to the radio receiver 2.

Preferably, the processing in the steps ST13 and ST14 is carried out at stated time intervals even in case no NoA coupling request is transmitted from the radio receiver 2. For example, it is carried out every 30 seconds. It is unnecessary to effect authentication every time the NoA request is made to the terminal management server 31, if within a preset time period the NoA server authentication ticket is valid. In case the NoA server authentication ticket is invalid, such as when the preset period for the ticket has elapsed, the NoA request is made again to the terminal management server 31 to repeat the processing as from step ST8 until step ST14.

On receipt of the relevant information data, corresponding to the relevant information, from the radio station, the NoA server 32 sends the received relevant information data to the radio receiver 2 (step ST15). The radio receiver 2 receives the relevant information data, sent from the NoA server 32, to record the received data in the memory 27. The radio receiver 2 also demonstrates the relevant information of FM broadcast signals the radio receiver is currently receiving on the display 26.

With the information providing system 1, embodying the present invention, the user is able to recognize, with ease, the radio station transmitting the FM broadcast signals, received by the radio receiver 2, that is, the radio station transmitting the FM broadcast signals, as selected by the tuner 22. Moreover, the user is able to be readily informed of the variable information pertinent to the FM broadcast signals, such as the name of the musical number, or the name of the performer singing or playing the musical number being heard.

With the information providing system 1, the terminal management server 31 and the NoA server 32 are unified together. Alternatively, the terminal management server 31 and the NoA server 32 may be connected as separate units to the Internet 5.

The processing in the information providing system 1 of advising the user of the name of the FM broadcasting station being received is explained further.

In the above-described information providing system 1, the user may further be advised of the radio station, as a source of transmission of FM broadcast signals, received by the radio receiver 2.

To this end, the information providing server 3 includes, in addition to the above-described function, the function of receiving frequency data and territory data, transmitted from the radio receiver 2, retrieving radio station specifying data, inclusive of the frequency data and the territory data received, and of transmitting the so retrieved radio station specifying data to the radio receiver 2. The information providing server 3 also receives and memorizes the radio station specifying data, transmitted from the radio receiver 2.

The information providing server 3 also includes the radio station specifying database 31B. The radio station specifying database 31B includes a table 33 having stored territory data, frequency data and radio station name data, as shown in FIG. 11. The radio station specifying database 31 records the radio station specifying data, sent from the radio receiver 2, in the table 33. In this table, there is recorded the number of times of registration of each radio station specifying data in the radio receiver 2.

On receipt of the frequency data and the territory data, sent from the radio receiver 2, the information providing server 3 refers to the table 33 to retrieve the radio station specifying data inclusive of the frequency data and the territory data received. When the radio station specifying data has been retrieved, the data retrieved is sent to the radio receiver 2. When a plural number of the radio station specifying data have been retrieved, the entire radio station specifying data are sent to the radio receiver 2. In case no radio station specifying data has been retrieved, the radio station specifying data having the coincident territory data are sent in their entirety to the radio receiver 2.

Figure 12:
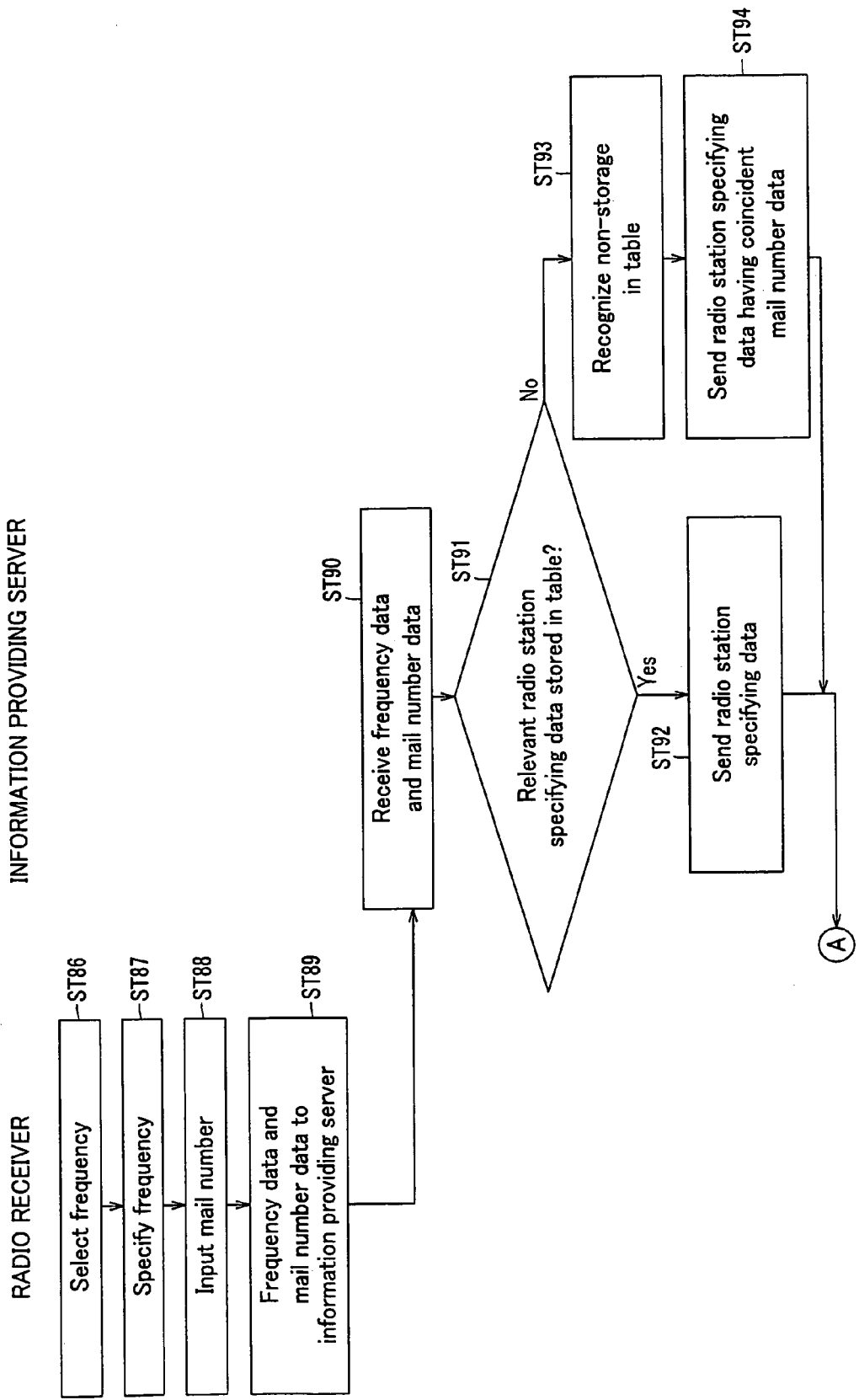
FIG. 12 is a flowchart showing the operation for specifying the source of transmission of FM broadcast signals received by the radio receiver in the information providing system.
Figure 13:
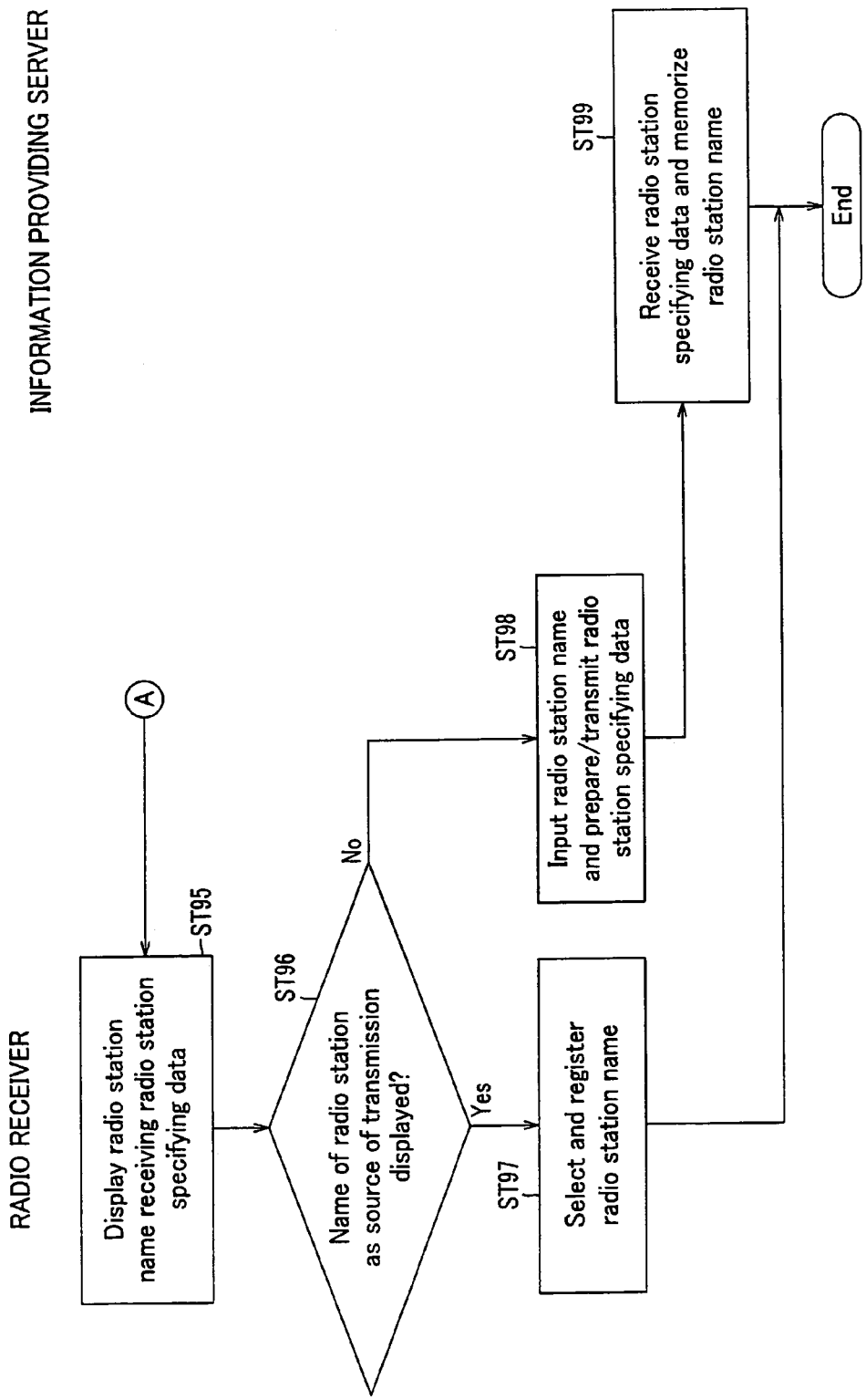
FIG. 13 is a flowchart showing the operation when radio station specifying data is recorded in the table of the radio station specifying server in the information providing system.

The method for specifying the radio station, transmitting the FM broadcast signals, received by the radio receiver 2, by the information providing system 1, is explained with reference to FIGS. 12 and 13.

First, in a step ST86, the tuner 22 selects the frequency of the FM broadcast signals, received by the antenna 21, by the user tuning the radio receiver 2.

In the next step ST87, the frequency selected by the tuner 22 is specified by the CPU 28.

In the next step ST88, the user acts on the operating unit 24 to enter the mail number corresponding to the territory where the radio receiver 2 is used.

In the next step ST89, the radio receiver 2 transmits the frequency data, corresponding to the frequency selected by the tuner 22, and the mail number data, corresponding to the mail number, input in the step ST88, by the transceiver unit 25, via the internet 5, to the information providing server 3.

In the next step ST90, the information providing server 3 receives frequency data and mail number data, transmitted from the radio receiver 2.

In the next step ST91, the information providing server 3 retrieves the radio station specifying data, corresponding to the frequency data and the mail number data, received in the step ST90, for verification. In case the radio station specifying data, corresponding to the frequency data and the mail number data, has been retrieved, that is, in case the data has been recorded in the table 33, the information providing server selects this radio station specifying data and proceeds to a step ST92. In case no radio station specifying data, corresponding to the frequency data and the mail number data, has been retrieved, that is, in case the data has not been recorded in the table 33, the information providing server proceeds to the step ST3.

In the step ST92, the information providing server 3 sends the radio station specifying data, selected in the step ST91, to the radio receiver 2. If two or more radio station specifying data have been selected, these data are sent in their entirety. The information providing server then proceeds to a step ST95.

In the step ST93, the information providing server 3 recognizes that no candidate of the radio station specifying data, to be sent to the radio receiver 2, is recorded in the table 33. For example, if a cable TV station is retransmitting FM broadcast signals, the FM broadcast signals, transmitted by an electrical wave of a frequency, not shown in the radio station specifying table, may sometimes be received by the radio receiver 2.

In the next step ST94, the information providing server 3 transmits all of the radio station specifying data, having the coincident mail number data, to the radio receiver 2, before proceeding to a step ST95.

In this step ST95, the radio receiver 2 receives the radio station specifying data, sent from the information providing server 3, and demonstrates the name of the radio station in the display 26, based on the radio station name data that go to make up the radio station specifying data received. If there are plural radio station specifying data received, all radio station names are displayed.

In the next step ST96, the radio receiver 2 verifies whether or not the name of the radio station, transmitting the FM broadcast signals, being received, is demonstrated on the display 26. If the name of the radio station is displayed, the radio receiver 2 selects the name of the radio station in a step ST97 and, after registration, terminates the processing. If no radio station name has been displayed, the radio receiver proceeds to a step ST98.

In the step ST98, the user acts on the operating unit 24 to input the name of the radio station transmitting the FM broadcast signals being received. The radio receiver 2 formulates radio station name data from the name of the radio station as input and coordinates the so formulated radio station name data, frequency data indicating the frequency of the FM broadcast signals being received, and the mail number data, to one another, to send the so coordinated data as radio station specifying data to the information providing server 3.

In a step ST99, the information providing server 3 receives the radio station specifying data, transmitted from the radio receiver 2, to record the so received data in the table 33.

If the radio station name has been registered in the step ST7, the radio receiver 2 preferably transmits registered data, indicating the name of the radio station registered, to the information providing server 3. The registered data are formulated as the radio station name data, indicating the names of the radio stations registered, frequency data indicating the frequency of the FM broadcast signals being received, and the territory data, specifying the territory where the radio receiver 2 is used, are coordinated to one another.

Preferably, the information providing server 3 counts the registered data, transmitted from the radio receiver 2, from one contents to the next, in order to count the number of the radio station specifying data registered. By leaving the radio station specifying data, with a larger number of times of registrations, the table 33 is improved in reliability. The table 33 with high reliability, formulated by the above-described method, may be used for other uses, such as sale. In the present embodiment, the radio station specifying data, known from the outset, are registered a number of times larger than 100 from the outset, so that these radio station specifying data are left in the table without regard to the actual number of times of registrations.

The operations of the information providing system 1 in case the radio receiver 2 transmits registration data, indicating the contents of the radio station specifying data registered, to the information providing server 3, when the radio station specifying data are prepared in the steps 98 and 21 and when the radio station name has been registered in the step ST97, now explained by giving a concrete example.

Figure 14:
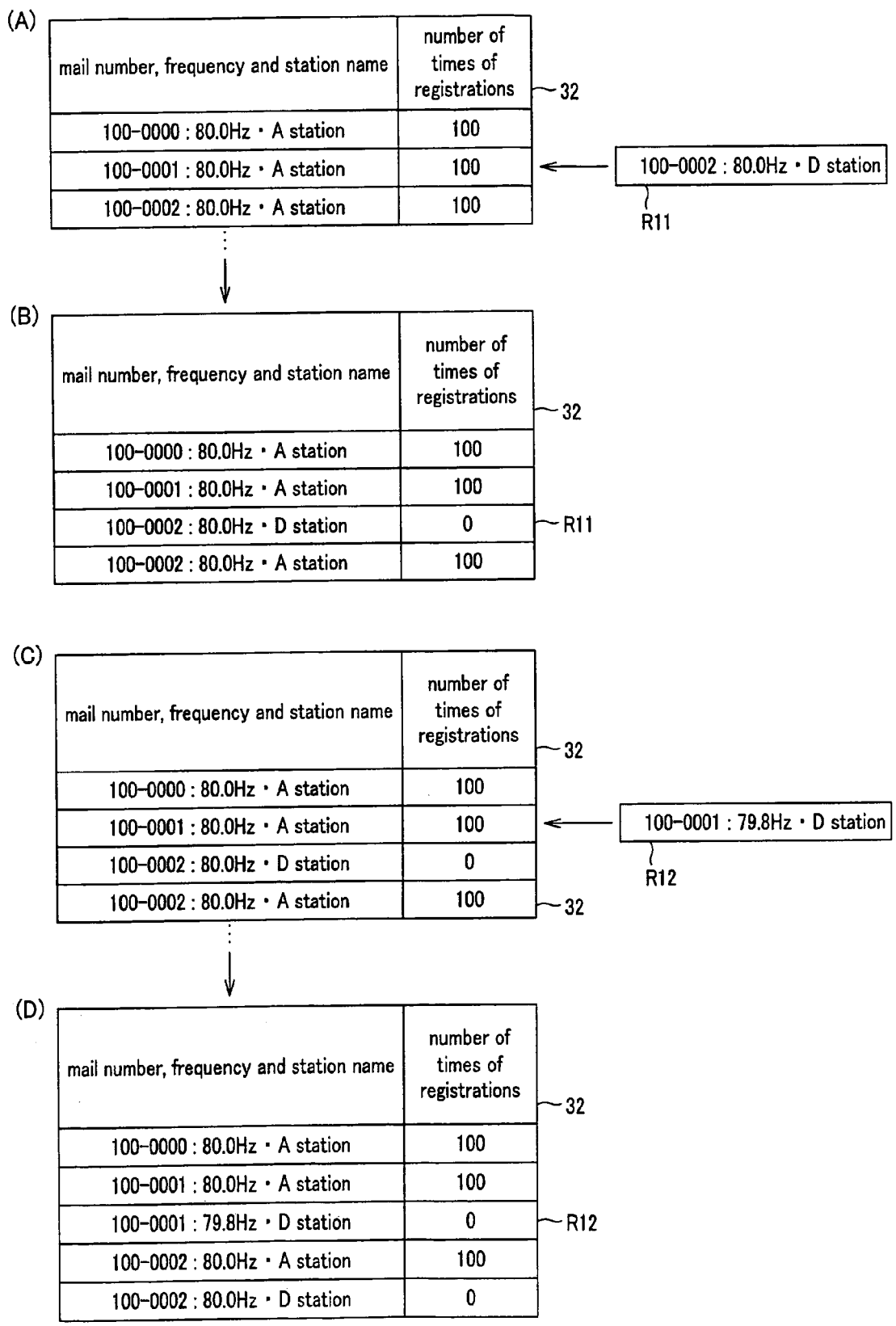
FIGS. 14(A) and 14(B) are schematic views showing the state in which radio station specifying data R11 is being recorded in a table.
FIGS. 14(C) and 14(D) are schematic views showing the state in which radio station specifying data R12 is being recorded in a table.

Referring first to FIG. 14(A), the radio receiver 2 correlates mail number data, indicating a mail number 100-0002, frequency data, indicating the frequency 80.0 Hz, and broadcasting station name data, indicating a broadcasting station D, to one another, and transmits the resulting data to the information providing server 3 as radio station specifying data R11 (step ST98). The information providing server 3 receives the radio station specifying data R11. Since the radio station specifying data R11 is not stored in the table 33, the information providing server 3 records the radio station specifying data R11 in the table 33, as shown in FIG. 14(B) (step ST99).

Referring first to FIG. 14(C), the radio receiver 2 correlates mail number data, specifying the mail number 100-0001, frequency data, indicating the frequency 79.8 Hz, and broadcasting station name data, indicating a broadcasting station D, to one another, and transmits the resulting data to the information providing server 3 as radio station specifying data R12 (step ST98). The information providing server 3 receives the radio station specifying data R12. Since the radio station specifying data R12 is not stored in the table 33, the information providing server 3 records the radio station specifying data R12 in the table 33, as shown in FIG. 14(D) (step ST99).

Figure 15:
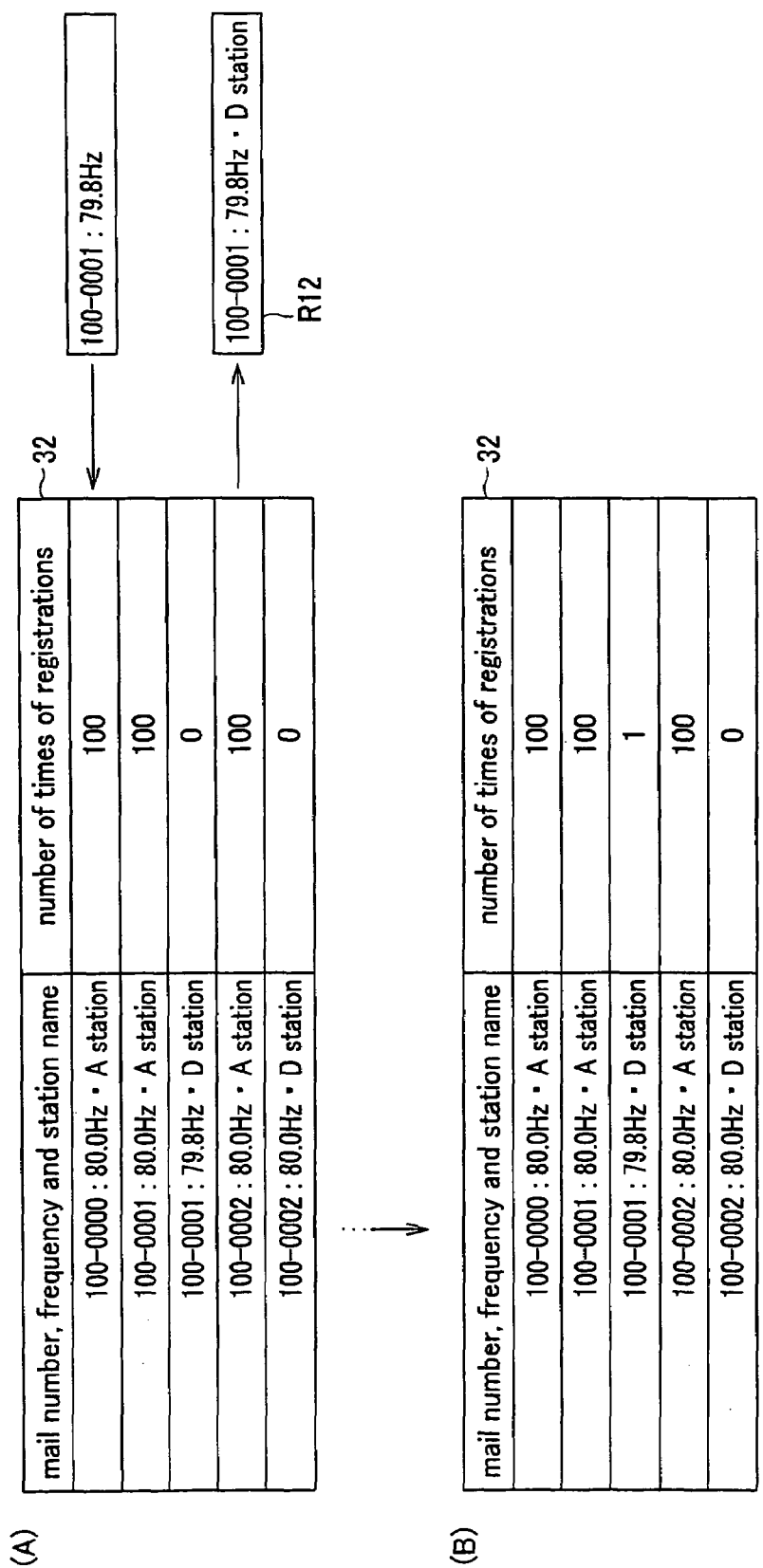
FIG. 15(A) schematically shows the state in which the radio station specifying data R12 has been sent to a radio receiver 2 based on territory data and frequency data sent from the radio receiver 2, and FIG. 15(B) schematically shows the state in which the number of times of registration of the radio station specifying data R12 has been increased.

Referring to FIG. 15(A), the radio receiver 2 transmits mail number data, specifying the mail number 100-0001, and frequency data, indicating the frequency 79.8 Hz, to the information providing server 3 (step ST89). On receipt of the mail number data, specifying the mail number 100-0001, and the frequency data, indicating the frequency 79.8 Hz (step ST90), the information providing server 3 retrieves the radio station specifying data R12, based on the mail number data and the frequency data received (step ST91), and transmits the retrieved data to the radio receiver 2 (step ST92).

On receipt and registration of the radio station specifying data R12 (steps ST95 to ST97), the radio receiver 2 formulates registration data, indicating that the radio station specifying data R12 has been registered, and transmits the so formulated registration data to the information providing server 3. The information providing server 3 receives the registration data and increments the number of times of registrations of the radio station specifying data R12 by 1, as shown in FIG. 15(B).

In the information providing system 1, described above, the radio receiver 2 formulates radio station name data from the radio station name as entered by the user, and coordinates the so formulated radio station name data, frequency data and the territory data, to one another, to send the so coordinated data as radio station specifying data to the information providing server 3. The information providing server 3 receives the radio station specifying data, transmitted from the radio receiver 2, to record the received data in the table 33.

That is, with the information providing system 1, according to the present invention, the contents of the table 33, used for specifying the name of the radio station, specifying the source of transmission of the FM broadcast signals being received, can be rewritten, at such time when a new radio station has been installed or when the frequency of the FM broadcast signals has been converted by the wired broadcast. Thus, with the information providing system 1, according to the present invention, it becomes possible to formulate a table 33 in which the radio station transmitting the FM broadcast signals received by the radio receiver 2 may be identified highly accurately. That is, with the information providing system 1, according to the present invention, the radio station transmitting the FM broadcast signals received by the radio receiver 2 can be identified highly accurately, thus enabling the user to be informed of the radio station name easily and accurately.

An example of application of the above-described information providing system 1 to an on-line CD (Compact-Disc) sale system or to a system for downloading contents data of music numbers is now explained in detail.

With the above-described information providing system 1, the user is able to purchase a CD, having stored the contents data of the music number being heard, by the radio receiver 2 being coupled to the CD (Compact-Disc) sale server over the Internet 5. On the other hand, the user is able to download contents data of the music air being heard, by the radio receiver 2 being coupled to the CD (Compact-Disc) distribution server over the Internet 5.

Figure 16:
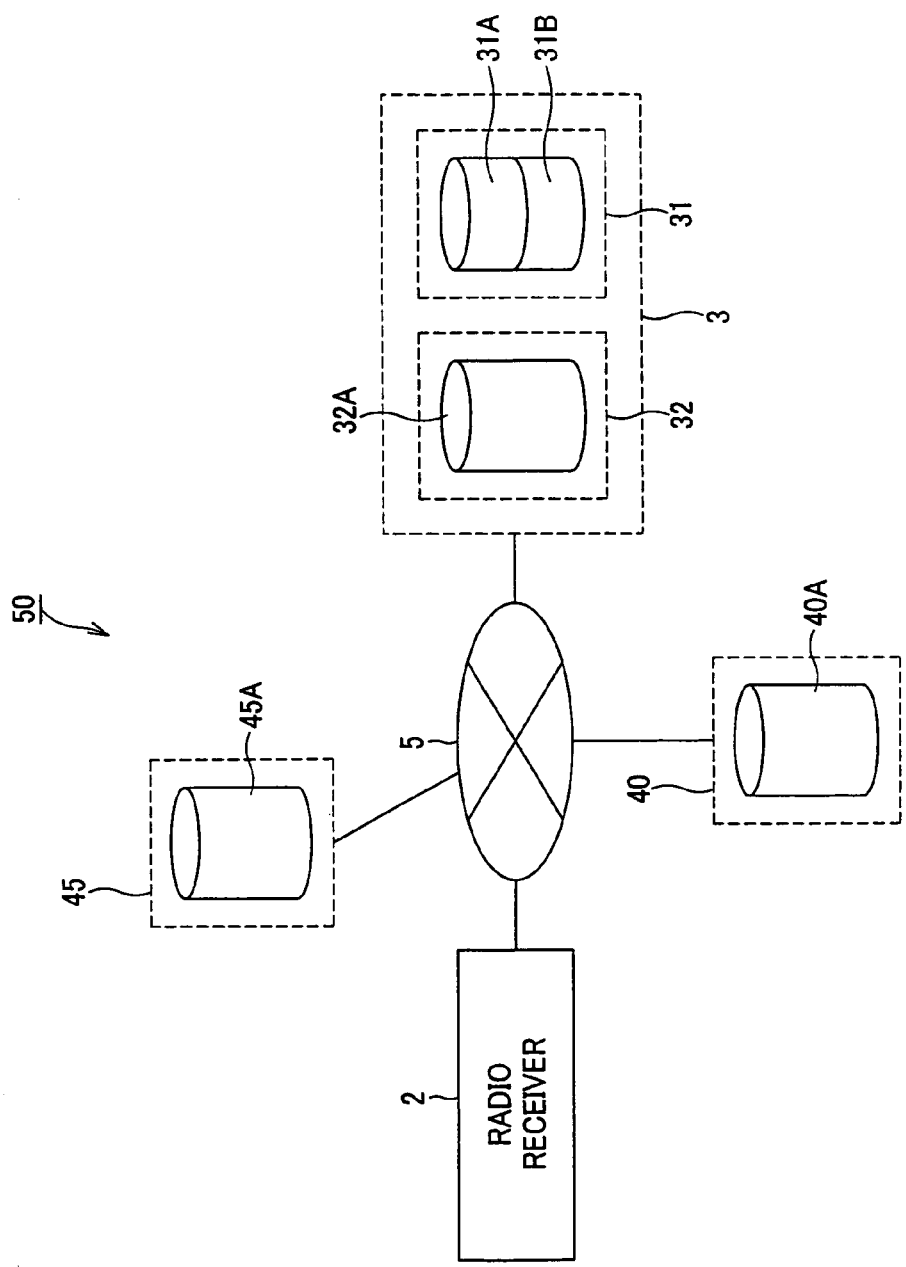
FIG. 16 shows a structure in which the information providing system of the present invention is provided with a CD sale server and a contents distribution server.

In the following, an information providing system 50, provided with a CD sale server 40 and with a contents distribution server 45, as shown in FIG. 16, is explained. In the following explanation, parts or components equivalent to those of the information providing system 1 shown in FIG. 1 are not explained, and are depicted by the same reference numerals as those used in FIG. 1.

The CD sale server 40 and the contents distribution server 45 interconnect the radio receiver 2 and the information providing server 3 over the Internet 5.

The CD sale server 40 includes a CD database 40A. The CD database 40A has stored therein CD specifying data, which is data indicating the title of a CD on sale, names of performers, CD number or music numbers stored in the CD, and by means of which a CD may be identified when the CD is to be on sale.

The contents distribution server 45 includes a contents database 45A. The contents database 45A has stored therein contents-related information data, such as contents distributed to the radio receiver 2, contents titles or contents numbers allocated to the contents.

Meanwhile, in the information providing system 50, the number of the credit card owned by the user of the radio receiver 2 is recorded in the customer management database 31A.

The method for purchasing or downloading a CD in the information providing system 50 is as explained below. It is noted that, in purchasing or downloading a CD in the information providing system 50, the processing up to the step ST11, explained in connection with FIG. 8, needs to be completed.

Figure 17:
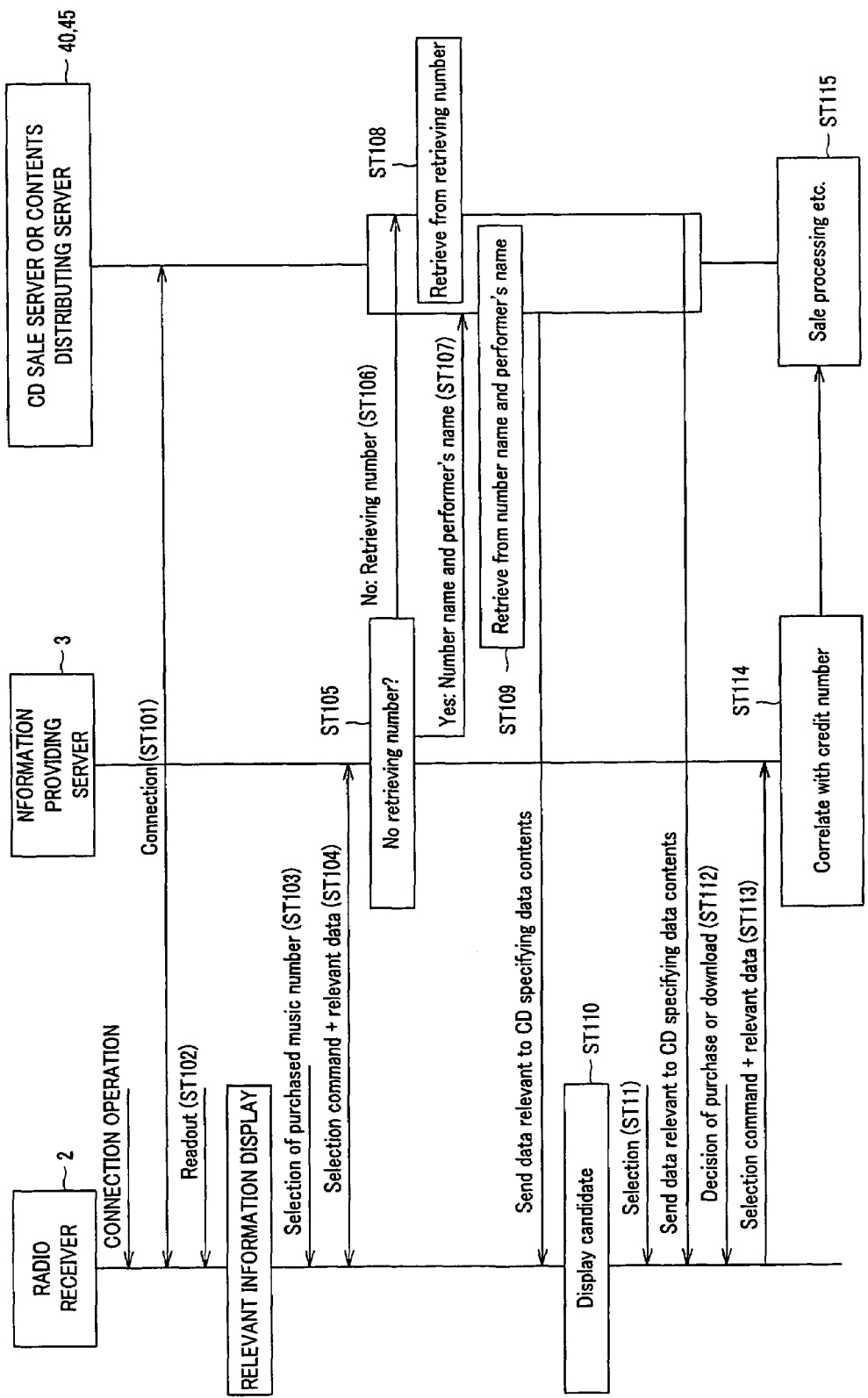
FIG. 17 illustrates the information transmission/receipt among the radio receiver, information providing server and the CD sale server in case of sale of CDs by the CD sale server or contents distribution by the contents distribution server.

Referring to FIG. 17, the user first acts on the operating unit 24, whereby the radio receiver 2 is connected to the CD sale server 40 or to the contents distribution server 45 over the Internet 5 (step ST101). The user is free to select whether the radio receiver 2 is connected to the CD sale server 40 or to the contents distribution server 45

The user then acts on the operating unit 24 to read out relevant information data stored in the memory 27 (step ST102). The radio receiver 2 demonstrates the relevant information on the display 26, based on the relevant information data read out from the memory 27. In the present embodiment, the relevant information for several music numbers, aired just before, is demonstrated on the display 26, in addition to the relevant information of the music number now being aired.

The user then acts on the operating unit 24 to select the music number, the CD of which is desired to be purchase, or the contents of which are desired to be downloaded, from among the music numbers, the relevant information for which has been demonstrated on the display 26 (step ST103).

When the music number has been selected by the user, the radio receiver 2 transmits the relevant information data, corresponding to the relevant information of the selected music number, to the information providing server 3, along with a selection command. Specifically, the radio receiver sends data indicating e.g. the name of a performer of the selected music number, name of the music number, CD number or the contents number, along with a selection command (step ST104).

The information providing server 3 then receives the relevant information data transmitted from the radio receiver 2.

If, in the step ST1, the radio receiver 2 connects to the CD sale server 40, the information providing server verifies the presence/absence of the CD number and, if, in the step ST1, the radio receiver 2 connects to the contents distribution server 45, the information providing server verifies the presence/absence of the contents number (step ST105).

Meanwhile, the CD number is the number accorded to each CD, while the contents number is the number accorded to each contents. The CD number and the contents number are collectively termed the retrieving number.

If it is verified in the step ST105 that there is the retrieving number, the information providing server 3 transmits data indicating the retrieving number to the CD sale server 40 or to the contents distribution server 45 (step ST106). If it is verified in the step ST105 that there is no retrieving number, the information providing server transmits data indicating the name of the performer (step ST107).

When data indicating the retrieving number is sent to the CD sale server 40 or to the contents distribution server 45, the CD sale server 40 or the contents distribution server 45 retrieves the CD specifying data or content-elated information data, based on the retrieving number. The CD sale server 40 or the contents distribution server 45 transmits the retrieved CD specifying data or contents-related information data to the radio receiver 2 (step ST108). The title of the CD, the name of the contents or the performer's name, for example, is demonstrated on the display 26 of the radio receiver 2, based on the received data.

In case data indicating the performer's name or the name of the music number is transmitted to the CD sale server 40 or the contents distribution server 45, the CD sale server 40 or the contents distribution server 45 retrieves the CD specifying data or contents-related information data, based on the CD specifying data or the contents related information data. The CD specifying data or the contents related information data, thus retrieved, is transmitted to the radio receiver 2 (step ST109). There are occasions where a plural number of the CD specifying data or a plural number of the contents-related information data are transmitted in the step ST109 to the radio receiver 2. In such case, plural CD titles, plural names of the contents or plural performers' names are demonstrated on the display 26 (step ST10). So, the user acts on the operating unit 24 to select the CD desired to be purchased or contents desired to be downloaded (step ST111).

The user then acts on the operating unit 24 to make a decision for purchasing the CDs, demonstrated on the display 26, or for downloading the contents, equally demonstrated on the display 26 (step ST112).

The radio receiver 2 sends the relevant information data for the CDs to be purchased or for the contents to be downloaded, to the information providing server 3, along with the purchase commands (step ST113). The information providing server 3 coordinates the received data with the user's credit card number and transmits the so coordinated information to the CD sale server 40 or to the contents distribution server 45 (step ST114). The CD sale server 40 or the contents distribution server 45 prosecute the sale processing or billing processing for distributing the CD off-line to the user or for downloading the contents, in accordance with the information transmitted from the information providing server 3 (step ST115).

With the information providing system 50, according to the present invention, described above, the CD having recorded therein the contents of the musical number, being heard by the user, may readily be purchased without the user taking the labor of noting the name of the musical number or the performer's name first before proceeding to purchasing. Moreover, the user is able to download the contents of the musical number being heard, without taking the labor of inputting the name of the number or inputting the performer's name. That is, with the information providing system 50, according to the present invention, the contents of the musical numbers being heard by the user may be procured extremely readily.

Preferably, the contents distributed by the contents distribution server 45 are encrypted in order to assure more strict copyright protection. In case the contents are encrypted, it is necessary that key data for decoding the encrypted contents are stored, along with the contents data, in the contents database 45A, and that the key data are transmitted, along with the contents, to the radio receiver 2.

The information providing system 50 may be configured so that the contents distribution server 45 transmits only the key data to the radio receiver 2, with the radio receiver 2 copying the encrypted contents stored in a preset site and decrypting the contents by the key data to reproduce the contents.

Although the radio receiver 2, receiving FM broadcast signals, has been explained above as a broadcasting receiving apparatus according to the present invention, the present invention may also be applied to a radio receiver adapted for receiving AM broadcast signals or a telecast receiving apparatus, such as a TV receiver. In case the present invention is applied to the television, channel data may be used as frequency data.

The invention claimed is:

1. An information providing system in which a broadcast receiving apparatus for receiving and demodulating broadcast signals of a selected frequency and a broadcast station specifying server for specifying a broadcasting station as a source of transmission of said broadcast signals are interconnected over a network, wherein said broadcast receiving apparatus includes user transmitting means for transmitting data over said network and user receiving means for receiving data over said network;

said broadcast station specifying server including broadcasting station specifying server storage means for storing frequency data corresponding to the frequency of said broadcasting signals, territory data corresponding to the territory where said broadcast receiving apparatus is used, and broadcasting station data corresponding to a broadcasting station specified by said frequency data and said territory data, said broadcasting station specifying server retrieving means for retrieving broadcasting station data stored in said broadcasting station specifying server storage means, based on said frequency data and said territory data, said broadcasting station specifying server receiving means for receiving data over said network and said broadcasting station specifying server transmitting means for transmitting data over said network;

said user transmitting means transmitting said territory data and said frequency data to said broadcast station specifying server;

said broadcasting station specifying server receiving means receiving said territory data transmitted by said user transmitting means and frequency data corresponding to the frequency of broadcast signals received by said broadcast receiving apparatus;

said broadcasting station specifying server retrieving means retrieving said broadcasting station data based on said territory data and said frequency data, received by said broadcasting station specifying server receiving means;

said broadcasting station specifying server transmitting means transmitting said broadcasting station data, retrieved by said broadcasting station specifying server retrieving means, to said broadcast receiving apparatus;

said user receiving means receiving the broadcasting station data, transmitted by said broadcasting station specifying server transmitting means.

2. The information providing system according to claim 1 wherein said broadcast receiving apparatus is connected over said network to a relevant information providing server;

said relevant information providing server including relevant information providing server storage means for storing relevant information data corresponding to the relevant information of said broadcast signals, relevant information providing server receiving means for receiving said broadcasting station data transmitted from said broadcast receiving apparatus, relevant information providing server retrieving means for retrieving relevant information data corresponding to the information relevant to broadcast signals received by said broadcast receiving apparatus, based on said broadcasting station data received by said relevant information providing server receiving means, and relevant information providing server transmitting means for transmitting relevant information data retrieved by said relevant information providing server retrieving means to said broadcast receiving apparatus;

said user transmitting means, provided to said broadcast receiving apparatus, transmitting the broadcasting station information to said relevant information providing server;

said user receiving means, provided to said broadcast receiving apparatus, receiving said relevant information data transmitted by said relevant information server transmitting means provided to said relevant information providing server.

3. The information providing system according to claim 2 wherein said broadcast receiving apparatus is connected over said network to a contents distributing server adapted for distributing the contents;

said contents distributing server including contents distributing server storage means for storing contents distributed to said broadcast receiving apparatus and/or key data necessary for reproduction of said contents, contents distribution server receiving means for receiving said relevant information data transmitted from said broadcast receiving apparatus, contents distribution server retrieving means for retrieving said contents and/or said key data stored in said contents distributing server storage means, based on said relevant information data received by said contents distribution server receiving means, and contents distribution server transmitting means for transmitting said contents and/or said key data retrieved by said contents distribution server retrieving means to said broadcast receiving apparatus;

said user transmitting means, provided to said broadcast receiving apparatus, transmitting said relevant information data to said contents distributing server;

said user receiving means, provided to said broadcast receiving apparatus, receiving said contents and/or said key data transmitted by said contents distributing server transmitting means.

4. The information providing system according to claim 2 wherein said broadcast receiving apparatus is connected to a recording medium sale server, adapted for selling recording mediums, having contents recorded thereon, over said network;

said recording medium sale server including recording medium sale server storage means, having stored therein recording medium specifying data specifying the recording mediums to be on sale, recording medium sale server receiving means receiving said relevant information data transmitted from said broadcast receiving apparatus, recording medium sale server retrieving means for retrieving said recording medium specifying data stored in said recording medium sale server storage means, based on said relevant information data received by said recording medium sale server receiving means, and recording medium sale server transmitting means for transmitting the recording medium specifying data retrieved by said recording medium sale server retrieving means;

said user transmitting means, provided to said broadcast receiving apparatus, transmitting said relevant information data through said recording medium sale server;

said user receiving means provided to said broadcast receiving apparatus receiving said recording medium specifying data transmitted by said contents distributing server transmitting means;

said user transmitting means, provided to said broadcast receiving apparatus, transmitting desired recording medium specifying data, out of the recording medium specifying data received by said user receiving means;

said recording medium sale server performing processing for selling the recording mediums based on recording medium data transmitted by said broadcast receiving apparatus.

5. The information providing system according to claim 1 wherein said broadcasting station specifying server and the relevant information providing server are unified together.

6. An information providing method comprising a first interconnecting step of interconnecting a broadcast receiving apparatus for receiving and demodulating broadcast signals of a selected frequency and a broadcast station specifying server specifying a broadcasting station as a source of transmission of said broadcast signals, over a network;

a first transmitting step of said broadcast receiving apparatus transmitting frequency data corresponding to the frequency of broadcast signals being received, and territory data corresponding to a territory where said broadcast receiving apparatus is used, to said broadcast station specifying server;

a first receiving step of said broadcast station specifying server receiving said frequency data and the territory data transmitted in said first transmitting step;

a first retrieving step of retrieving broadcasting station data corresponding to a broadcasting station transmitting said broadcast signals being received by said broadcast receiving apparatus, based on said frequency data and the territory data received in said first receiving step;

a second transmitting step of transmitting said broadcasting station data, retrieved by said first retrieving step, to said broadcast receiving apparatus; and a second receiving step of said broadcast receiving apparatus receiving said broadcasting station data transmitted in said second transmitting step.

7. The information providing method according to claim 6 further comprising a second connection step of interconnecting said broadcast receiving apparatus and a relevant information providing server transmitting relevant information data of broadcast signals being received by said broadcast receiving apparatus, over a network;

a third transmitting step of said broadcast receiving apparatus transmitting said broadcasting station data, received in said second receiving step, to said relevant information providing server;

a third receiving step of said relevant information providing server receiving broadcasting station data transmitted from said broadcast receiving apparatus in said third transmitting step;

a second retrieving step of retrieving relevant information data corresponding to the relevant information of broadcast signals being received by said broadcast receiving apparatus, based on broadcasting station data received by said third receiving step;

a fourth transmitting step of transmitting the relevant information data, retrieved by said second retrieving step, to said broadcast receiving apparatus; and a fourth receiving step of said broadcast receiving apparatus receiving relevant information data transmitted in said fourth transmitting step.

8. The information providing method according to claim 7 further comprising a third interconnecting step of interconnecting said broadcast receiving apparatus and a contents distributing server distributing contents data and/or key data necessary in using said contents data, over a network;

a fifth transmitting step of said broadcast receiving apparatus transmitting said relevant information data received by said fourth receiving step to said contents distributing server;

a fifth receiving step of said contents distributing server receiving relevant information data transmitted in said fifth transmitting step from said broadcast receiving apparatus;

a third retrieving step of said contents distributing server retrieving said contents data and/or said key data based on the relevant information data received in said fifth receiving step;

a sixth transmitting step of said contents distributing server transmitting said contents data and/or said key data retrieved in said third retrieving step to said broadcast receiving apparatus; and a sixth receiving step of said broadcast receiving apparatus receiving said contents data and/or said key data transmitted in said sixth transmitting step.

9. The information providing method according to claim 7 further comprising a fourth interconnecting step of interconnecting, over a network, said broadcast receiving apparatus and a recording medium sale server selling recording mediums having contents recorded thereon;

a seventh transmitting step of said broadcast receiving apparatus transmitting said relevant information data received in said fourth receiving step to said recording medium sale server;

a seventh receiving step of said recording medium sale server receiving relevant information data transmitted in said seventh transmitting step from said broadcast receiving apparatus;

a fourth retrieving step of said recording medium sale server retrieving recording medium specifying data, specifying recording mediums that are on sale, based on the relevant information data received in said seventh receiving step;

an eighth transmitting step of said recording medium sale server transmitting the recording medium specifying data, retrieved in said fourth retrieving step, to said broadcast receiving apparatus;

an eighth receiving step of said broadcast receiving apparatus receiving the recording medium specifying data, transmitted in said eighth transmitting step;

a ninth transmitting step of said broadcast receiving apparatus transmitting desired recording medium specifying data, out of the recording medium specifying data received in said eighth receiving step, to said recording medium sale server; and a sale processing step of said recording medium sale server performing sale processing of recording mediums, based on recording medium specifying data transmitted in said ninth transmitting step.

10. An information providing system in which a broadcast receiving apparatus for receiving and demodulating broadcast signals of a selected frequency and a broadcast station specifying server for specifying a broadcasting station as a source of transmission of said broadcast signals are interconnected over a network, wherein said broadcast receiving apparatus includes,
  a user transmitting unit configured to transmit data over said network, and
  a user receiving unit configured to receive data over said network;

said broadcast station specifying server including,
  a broadcasting station specifying server storage unit configured to store frequency data corresponding to the frequency of said broadcasting signals, territory data corresponding to the territory where said broadcast receiving apparatus is used, and broadcasting station data corresponding to a broadcasting station specified by said frequency data and said territory data,
  a broadcasting station specifying server retrieving unit configured to retrieve broadcasting station data stored in said broadcasting station specifying server storage unit, based on said frequency data and said territory data, and
  a broadcasting station specifying server receiving unit configured to receive data over said network and a broadcasting station specifying server transmitting unit configured to transmit data over said network;

said user transmitting unit transmitting said territory data and said frequency data to said broadcast station specifying server;

said broadcasting station specifying server receiving unit receiving said territory data transmitted by said user transmitting unit and frequency data corresponding to the frequency of broadcast signals received by said broadcast receiving apparatus;

said broadcasting station specifying server retrieving unit retrieving said broadcasting station data based on said territory data and said frequency data, received by said broadcasting station specifying server receiving unit;

said broadcasting station specifying server transmitting unit transmitting said broadcasting station data, retrieved by said broadcasting station specifying server retrieving unit, to said broadcast receiving apparatus; and said user receiving unit receiving the broadcasting station data, transmitted by said broadcasting station specifying server transmitting unit.

11. The information providing system according to claim 10 wherein said broadcast receiving apparatus is connected over said network to a relevant information providing server;

said relevant information providing server including,
- a relevant information providing server storage unit configured to store relevant information data corresponding to the relevant information of said broadcast signals,
- a relevant information providing server receiving unit configured to receive said broadcasting station data transmitted from said broadcast receiving apparatus,
- a relevant information providing server retrieving unit configured to retrieve relevant information data corresponding to the information relevant to broadcast signals received by said broadcast receiving apparatus, based on said broadcasting station data received by said relevant information providing server receiving unit, and
- a relevant information providing server transmitting unit configured to transmit relevant information data retrieved by said relevant information providing server retrieving unit to said broadcast receiving apparatus;

said user transmitting unit, provided to said broadcast receiving apparatus, transmitting the broadcasting station information to said relevant information providing server; and said user receiving unit, provided to said broadcast receiving apparatus, receiving said relevant information data transmitted by said relevant information server transmitting unit provided to said relevant information providing server.

12. The information providing system according to claim 11 wherein
said broadcast receiving apparatus is connected over said network to a contents distributing server adapted for distributing the contents;
said contents distributing server including,
- a contents distributing server storage unit configured to store contents distributed to said broadcast receiving apparatus and/or key data necessary for reproduction of said contents,
- a contents distribution server receiving unit configured to receive said relevant information data transmitted from said broadcast receiving apparatus,
- a contents distribution server retrieving unit configured to retrieve said contents and/or said key data stored in said contents distributing server storage unit, based on said relevant information data received by said contents distribution server receiving unit, and
- a contents distribution server transmitting unit configured to transmit said contents and/or said key data retrieved by said contents distribution server retrieving unit to said broadcast receiving apparatus;

said user transmitting unit, provided to said broadcast receiving apparatus, transmitting said relevant information data to said contents distributing server; and said user receiving unit, provided to said broadcast receiving apparatus, receiving said contents and/or said key data transmitted by said contents distributing server transmitting unit.

13. The information providing system according to claim 11 wherein said broadcast receiving apparatus is connected to a recording medium sale server, adapted for selling recording mediums, having contents recorded thereon, over said network;
said recording medium sale server including,
- a recording medium sale server storage unit, having stored therein recording medium specifying data specifying the recording mediums to be on sale,
- a recording medium sale server receiving unit configured to receive said relevant information data transmitted from said broadcast receiving apparatus,
- a recording medium sale server retrieving unit configured to retrieve said recording medium specifying data stored in said recording medium sale server storage unit, based on said relevant information data received by said recording medium sale server receiving unit, and
- a recording medium sale server transmitting unit configured to transmit the recording medium specifying data retrieved by said recording medium sale server retrieving unit;

said user transmitting unit, provided to said broadcast receiving apparatus, transmitting said relevant information data through said recording medium sale server;

said user receiving unit provided to said broadcast receiving apparatus receiving said recording medium specifying data transmitted by said contents distributing server transmitting unit;

said user transmitting unit, provided to said broadcast receiving apparatus, transmitting desired recording medium specifying data, out of the recording medium specifying data received by said user receiving unit; and said recording medium sale server performing processing for selling the recording mediums based on recording medium data transmitted by said broadcast receiving apparatus.

14. The information providing system according to claim 10 wherein
said broadcasting station specifying server and the relevant information providing server are unified together.

* * * * *